(12) United States Patent
Zaveruha et al.

(10) Patent No.: US 11,601,010 B2
(45) Date of Patent: Mar. 7, 2023

(54) NETWORKED LIGHTING CONTROL SYSTEM WITH DEDICATED KEEPALIVE NORMAL POWER EMERGENCY PROTOCOL

(71) Applicant: ABL IP HOLDING LLC, Conyers, GA (US)

(72) Inventors: Ryan A. Zaveruha, Trumbull, CT (US); Richard L. Westrick, Jr., Social Circle, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 36 days.

(21) Appl. No.: 17/385,229

(22) Filed: Jul. 26, 2021

(65) Prior Publication Data

US 2023/0021905 A1    Jan. 26, 2023

(51) Int. Cl.
*H05B 47/10*     (2020.01)
*H02J 9/02*      (2006.01)
*H02J 13/00*     (2006.01)

(52) U.S. Cl.
CPC .......... *H02J 9/02* (2013.01); *H02J 13/00026* (2020.01)

(58) Field of Classification Search
None
See application file for complete search history.

(56) References Cited

U.S. PATENT DOCUMENTS

| | | |
|---|---|---|
| 9,820,361 B1 | 11/2017 | Turvy, Jr. et al. |
| 9,883,570 B1 | 1/2018 | Turvy, Jr. et al. |
| 10,085,328 B2 | 9/2018 | Barna et al. |
| 10,416,243 B2 | 9/2019 | Nelson et al. |
| 10,637,282 B2 | 4/2020 | Roquemore, III et al. |
| 10,652,972 B1 * | 5/2020 | Norton .................. H05B 45/00 |
| 2010/0327766 A1 | 12/2010 | Recker et al. |
| 2013/0127362 A1 | 5/2013 | Trainor et al. |

(Continued)

OTHER PUBLICATIONS

"Cold-Compliant Control of Emergency Luminaires," https://www.ul.com/news/code-compliant-control-emergency-luminaires, Jul. 16, 2018, 4 pages.

(Continued)

*Primary Examiner* — Dedei K Hammond
(74) *Attorney, Agent, or Firm* — RatnerPrestia

(57) ABSTRACT

A lighting control system includes a control group including a plurality of member devices which includes a power monitor and an emergency luminaire. The power monitor includes a power supply driven by a normal power source. The power monitor implements the following function. Transmit, via a wireless lighting control network, a normal power active message to the control group repeatedly at a predetermined time interval. The emergency luminaire includes an emergency light source to continuously emit illumination lighting during an emergency, and a power supply driven by an emergency power line. The emergency luminaire implements the following functions. Track an active message gap time. Reset the active message gap time after receiving the normal power active message. In response to the tracked active message gap time exceeding an active message timeout, enter an emergency mode active state by controlling the emergency light source to continuously emit the illumination lighting.

20 Claims, 8 Drawing Sheets

(56) References Cited

U.S. PATENT DOCUMENTS

2014/0028200 A1   1/2014   Van Wagoner et al.
2017/0223807 A1   8/2017   Recker et al.
2019/0252911 A1   8/2019   Roquemore, III et al.
2019/0261493 A1*  8/2019   Dolan .................... H05B 47/19

OTHER PUBLICATIONS

"Code-Compliant Control of Emergency Luminaires," https://www.ul.com/news/code-compliant-control-emergency-luminaires, Jul. 16, 2018, 4 pages.
Canadian Office Action for Canadian Application No. 3,095,738, dated Jan. 13, 2022, 8 pages.

* cited by examiner

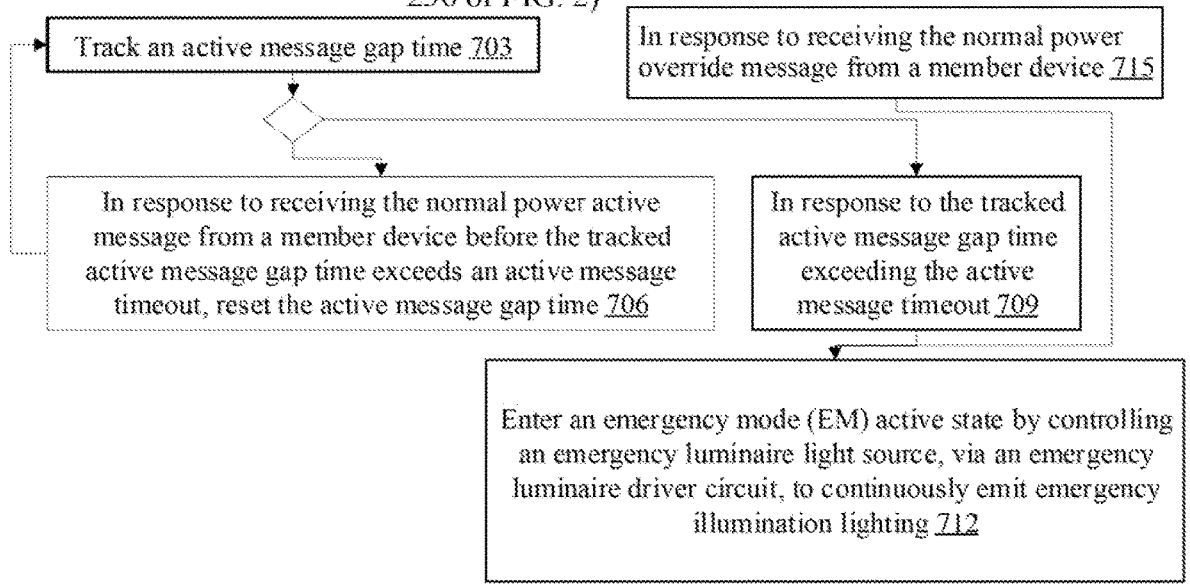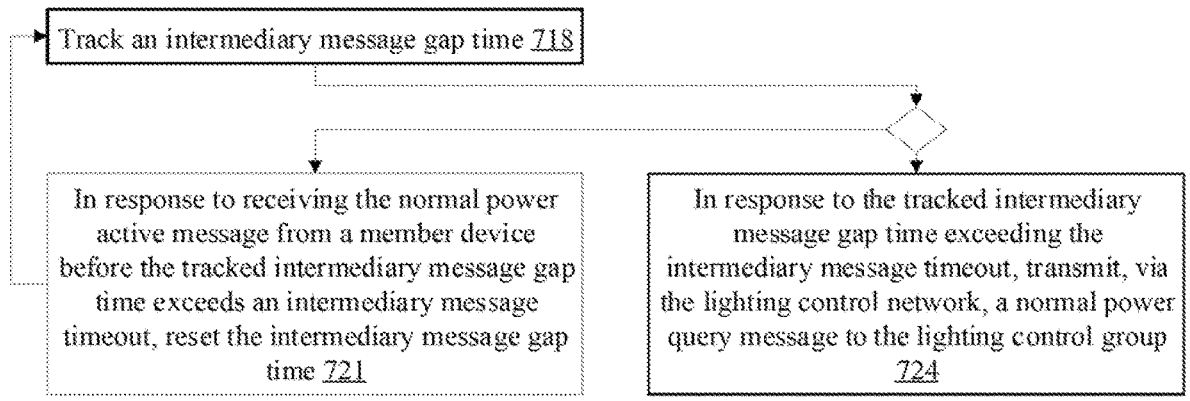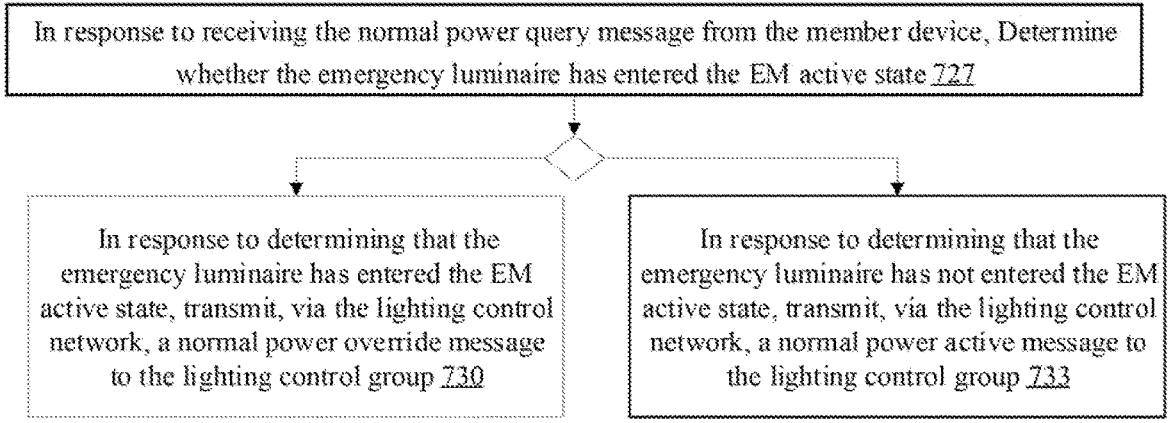
FIG. 7A

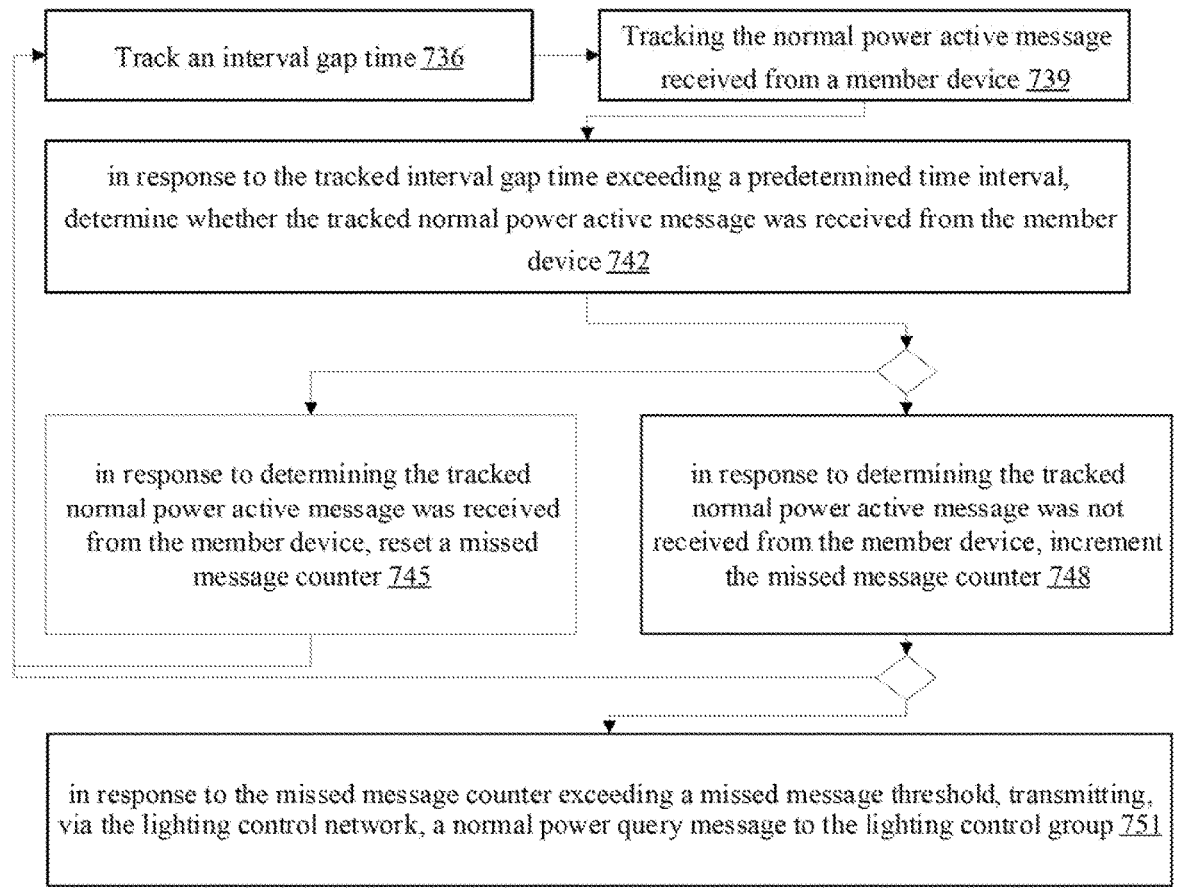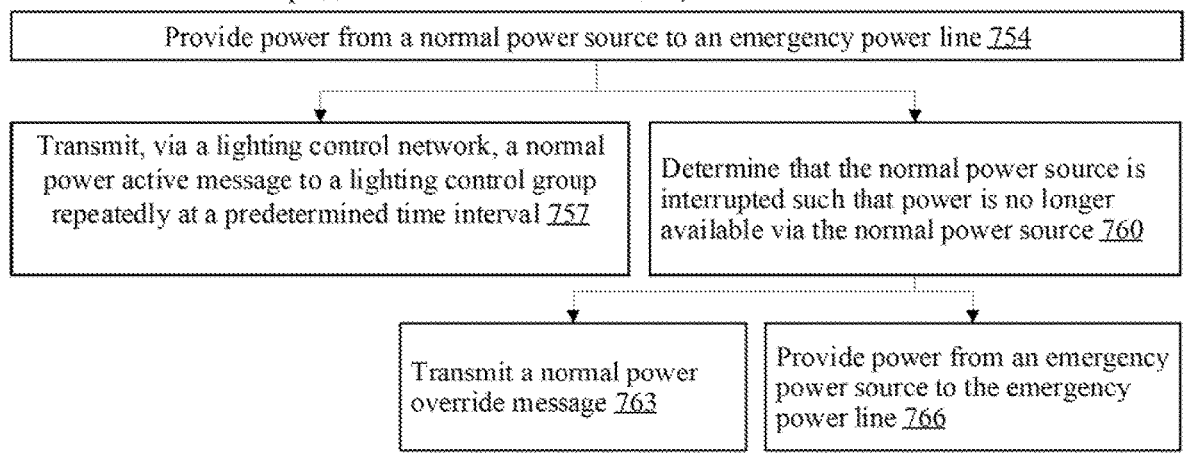
FIG. 7B

NETWORKED LIGHTING CONTROL SYSTEM WITH DEDICATED KEEPALIVE NORMAL POWER EMERGENCY PROTOCOL

BACKGROUND

Electrically powered artificial lighting for general illumination has become ubiquitous in modern society. Electrical lighting equipment is commonly deployed, for example, in homes, buildings of commercial and other enterprise establishments, as well as in various outdoor settings.

In conventional luminaires, the luminance output can be turned ON/OFF and often can be adjusted up or dimmed down. In some luminaires, e.g., using multiple colors of light emitting diode (LED) type sources, the user may be able to adjust a combined color output of the resulting illumination. The changes in intensity or color characteristic of the illumination may be responsive to manual user inputs or responsive to various sensed conditions in or about the illuminated space.

During emergency conditions, a building (e.g., school or office building) may require evacuation as quickly and safely as possible. When a line power source (e.g., wall power or street power) that powers regular luminaires is interrupted, building codes typically require illumination of the egress pathway using emergency lights. Specific designated egress pathway areas are typically targeted for emergency illumination—stairs, aisles, hallways, ramps, escalators, walkways, and exit passages. Such pathways for egress and exit signage are needed to guide and direct occupants of the building to a public way (e.g., street).

Emergency luminaires continuously emit emergency illumination lighting at an emergency illumination levels, for example at a minimum of 1.0 foot candles (fc) for a 90 minute period. Currently with emergency luminaires, as per Underwriter Laboratories 924 (UL924) standards in the industry for emergency lighting, emergency lights enter into emergency mode upon sensing an interruption in power. However, due to improved emergency transfer switches as well as emergency power supplies with more immediate availability, such as battery-assisted generators, the interruption in power caused by the loss of normal power and the switching between normal and emergency power supplies can in some cases be substantially reduced. The interruption can be so brief that emergency lights may not be able to consistently detect when normal power is lost and emergency power is utilized. Updated standards for UL924 will require that emergency lights monitor for control signals, and that the monitoring occur independently of the emergency power feeding through the emergency light.

Regarding emergency luminaires, U.S. Pat. No. 10,416,243, issued on Sep. 17, 2019, titled "Test Configuration for Emergency Lighting Fixtures," to applicant ABL IP Holding, LLC, which is incorporated by reference as if fully set forth herein, describes an emergency light fixture and a test configuration. U.S. Pat. No. 10,637,282, issued on Apr. 28, 2020, titled "Light Fixture with Power Loss Detection and Emergency Egress Mode," to applicant ABL IP Holding, LLC, which is incorporated by reference as if fully set forth herein, describes a technique for detecting power loss by a driver in an emergency light fixture and switching the emergency light fixture from a normal operation mode to an emergency mode upon detecting the power loss. U.S. Pat. No. 10,652,972, issued on May 12, 2020, titled "Wireless Lighting Control System with Automatic Emergency Mode Exit Network Protocol," to applicant ABL IP Holding, LLC, which is incorporated by reference as if fully set forth herein, describes network protocols for a wireless lighting control system to allow wirelessly controlled emergency luminaires to efficiently and automatically turn off when line power is restored.

Conventional wall switches and luminaires communicate over wired systems. More recent lighting systems are wireless, which allow communication over a radio frequency (RF) network. Regarding wireless lighting control systems, U.S. Pat. No. 9,820,361, issued on Nov. 14, 2017, titled "Wireless Lighting Control System," to applicant ABL IP Holding, LLC, which is incorporated by reference as if fully set forth herein, describes a wireless lighting control system that is commissioned over a commissioning network and is controlled over a wireless lighting control network. U.S. Pat. No. 9,883,570, issued on Jan. 30, 2018, titled "Protocol for Lighting Control via a Wireless Network," to applicant ABL IP Holding, LLC, which is incorporated by reference as if fully set forth herein, describes a wireless lighting control system with lighting control groups.

However, there is no specific lighting control system design, including both the wireless communication network as well as the particular electrical wiring, to facilitate the updated UL924 standards. Accordingly, efficient and robust lighting control systems are needed for emergency lighting to operate both safely and accurately when the normal lighting power source is quickly swapped for the emergency lighting power source to overcome these and other limitations in the art.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 7A-B depict a dedicated keepalive normal power monitoring emergency protocol for supporting emergency luminaires entering an emergency mode active state upon loss of normal power.

DETAILED DESCRIPTION

Figure 1:
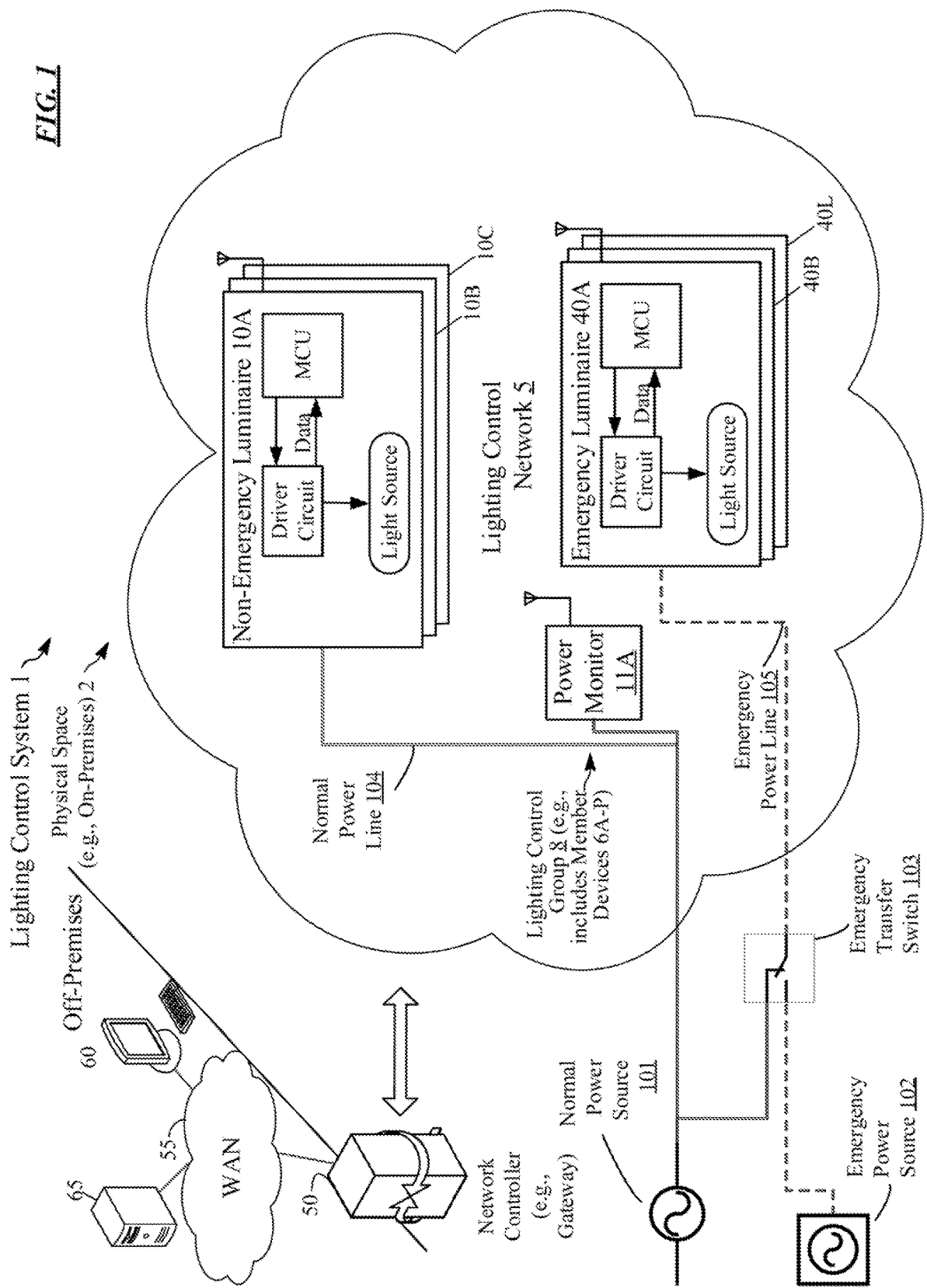
FIG. 1 is a high-level functional block diagram of an example of a lighting control system including a power monitor solely connected to a normal power feed that supports emergency luminaires entering an emergency mode active state.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Although the discussion herein is focused on light fixture type luminaires that have a fixed position in a space, it should be understood that other types of luminaires can be used/sensed in lieu of light fixtures, such as lamps. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaries in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "lighting control system" or "lighting system" as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting" or "illumination lighting" as used herein, are intended to encompass essentially any type of lighting in which a luminaire produces light by processing of electrical power to generate the light. A luminaire for artificial lighting or illumination lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). The electronics for driving and/or controlling the lighting component(s) may be incorporated within the luminaire or located separately and coupled by appropriate means to the light source component(s).

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

FIG. 1 is a high-level functional block diagram of an example of a lighting control system 1 that includes twelve emergency luminaires 40A-L three non-emergency luminaires 10A-C, and a power monitor 11A and supports a dedicated keepalive normal power monitoring emergency protocol 700 (see FIGS. 7A-B) for emergency illumination lighting. Lighting control system 1 provides a variety of lighting controls of a lighting control group 8 over a separate lighting control network, and may support light commissioning/maintenance network communication over the lighting control network 5 or a separate commissioning network 7 (see FIGS. 2-4.) In the example, the lighting control group 8 includes sixteen member devices 6A-P (twelve emergency luminaires 40A-L, three non-emergency luminaires 10A-C, and one power monitor 11A). Lighting control communication include communications in support of turning lights on/off, dimming, set scene, and sensor trip events.

The lighting control system 1 includes a normal power source 101, which in this example is alternating current provided by a third-party electricity provider. The normal power source 101 is the typical or default power provider for the lighting control system 1, and a loss of power sent by the normal power source 101 indicates an emergency state. The normal power source 101 is referred to as grid power, wall power, and domestic power, alternating current (AC) electric power produced and delivered via AC mains to homes and businesses. Normal power source 101 is the form of electrical power that consumers use when they plug in domestic appliances, televisions and electric lamps into wall outlets. Normal power source 101 conveys line power, sometimes referred to as "household power," "household electricity," "house current," "powerline," "domestic power," "wall power," "line power," "AC power", "city power," "street power" that is produced by an electric utility provider. The normal power source 101 feeds electricity to the non-emergency luminaires 10A-C via a normal power line 104. Other devices within the physical space 2 but not considered part of the lighting control system 1 may be fed electricity off the normal power line 104, in particular those devices that do not need to function during an emergency state.

The lighting control system 1 also includes an emergency power source 102, which in this example is alternating current provided by an electrical generator within the physical space 2. The emergency power source 102 can be a backup generator, an industrial battery, or a combination of the two. If an industrial battery is used, the industrial battery may be charged by the normal power source 101 during a non-emergency state, so that the emergency power source 102 can provide power during an emergency state. The emergency power source 102 is a battery, solar panel, or any other AC or DC source (e.g. a generator) that is not line powered. The emergency power source 102 feeds electricity to the emergency luminaires 40A-L via an emergency power line 105. Other emergency devices within the physical space 2 but not considered part of the lighting control system may be fed electricity off the emergency power line 105, in particular those devices that provide for occupant safety, devices that provide mission critical services, or devices with a negligible electrical load requirement. The electrical load requirements of all devices receiving power from the emergency power line 105 must be considered in order to not overload the emergency power source 102 during an emergency state.

Figure 5:
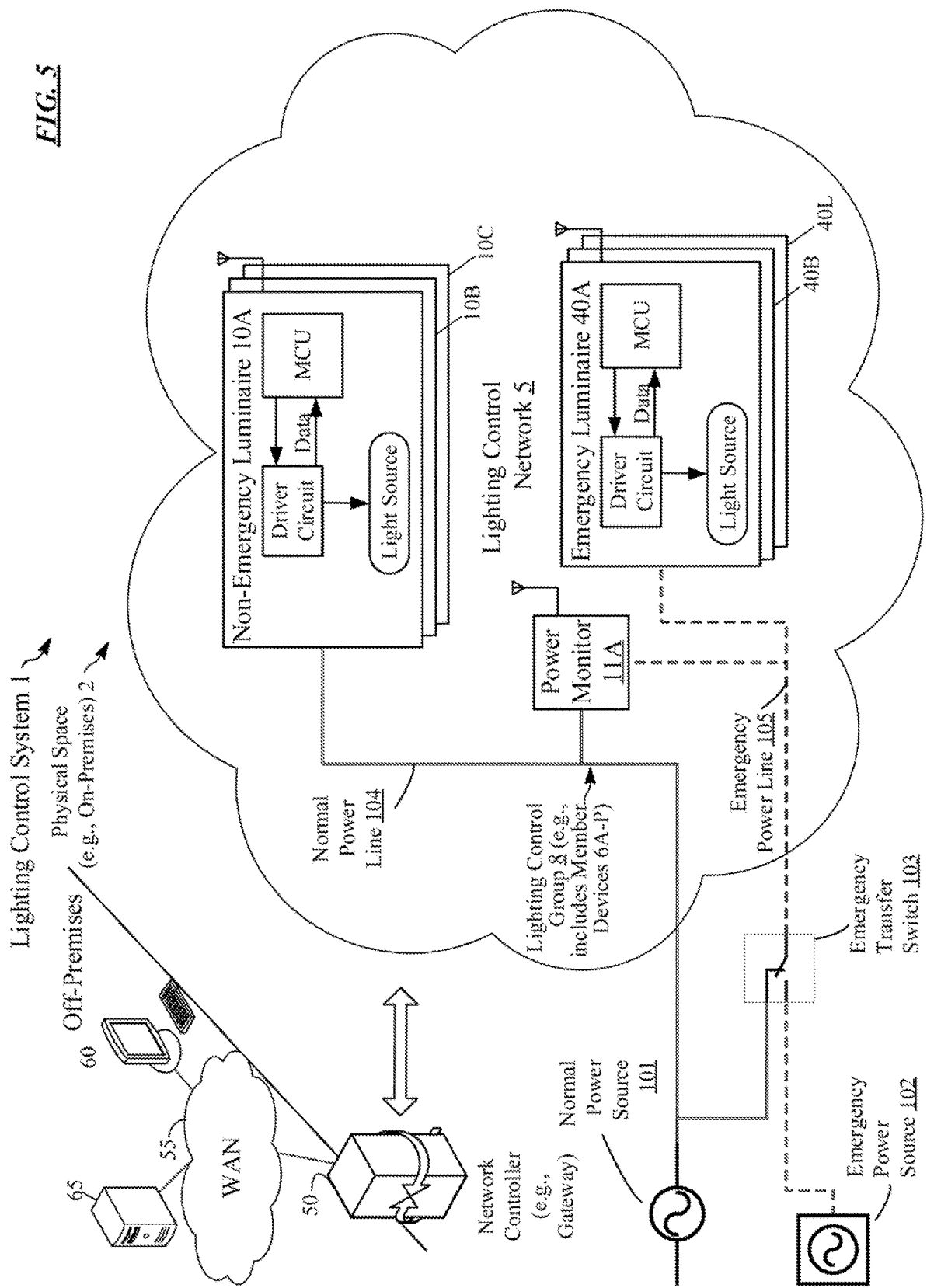
FIG. 5 is a high-level functional block diagram of an example of a lighting control system including a power monitor connected to a normal power feed and an emergency power feed that supports emergency luminaires entering an emergency mode active state.
Figure 6:
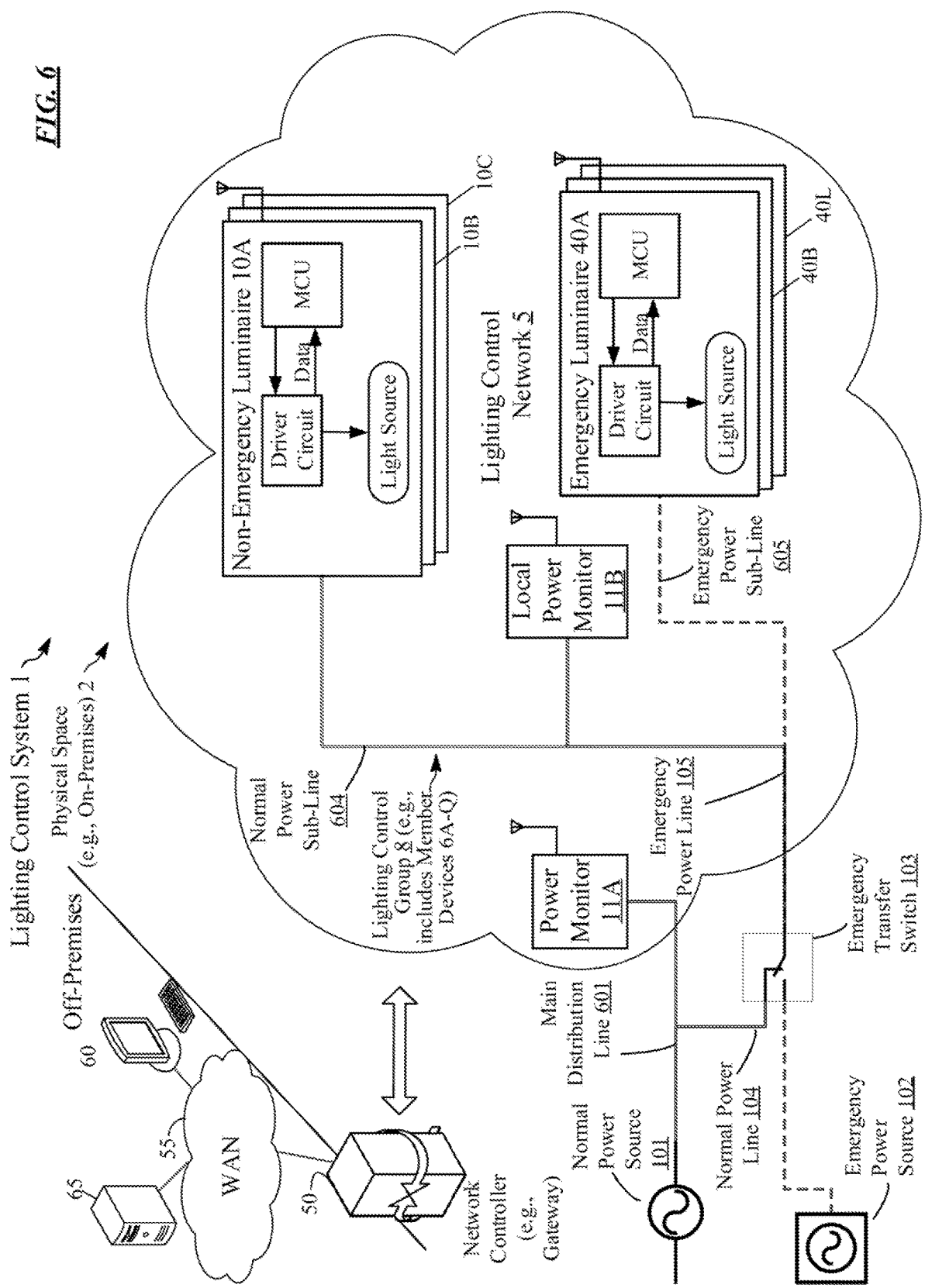
FIG. 6 is a high-level functional block diagram of an example of a lighting control system including a power monitor connected to a normal power source and a local power monitor connected to a normal power sub-line that supports emergency luminaires entering an emergency mode active state.

The lighting control system further includes a power monitor 11A, which is powered by electricity fed via the normal power line 104. The power monitor 11A is described in further detail in FIG. 3, but briefly the power monitor 11A transmits a normal power active message 170A periodically, to inform the other member devices 6A-O of the lighting control group that the normal power line 104 is energized, and that the lighting control system 1 does not need to enter an emergency state. Because the power monitor 11A in this example is solely powered by the normal power line 104 (and consequently the normal power source 101), if the normal power source 101 fails, the power monitor 11A will lose power and will not be able to send the normal power active message 170A. The lack of a periodically-sent normal power active message 170A over the lighting control network 5 to the lighting control group 8 indicates to the emergency luminaires 40A-L that the emergency luminaires 40A-L should enter an emergency state, and provide emergency illumination. In FIGS. 5-6, alternative wiring strategies can potentially allow the power monitor 11A to continue to receive electricity from the emergency power source 102 via the emergency power line 105.

The lighting control system 1 still further includes an emergency transfer switch 103. This emergency transfer switch 103 directs electricity from the normal power source 101 through the emergency power line 105 when the normal power source 101 is providing electricity. At such times, the emergency power source 102 is idle or charging. When the normal power source 101 fails and is no longer providing electricity, the emergency transfer switch 103 instead draws electricity from the emergency power source 102 and provides it to the emergency luminaires 40A-L via the emergency power line. The emergency transfer switch 103 could be manually switched, but in this example is an automatic change-over contact switch, designed to switch to the emergency power source 102 once the normal power source 101 experiences a significant or complete drop in current. Additionally, the emergency power source 102 could be a passive source such as a battery, which means that the emergency transfer switch 103 switching to the emergency power source 102 results in instantaneous draw. Alternatively, the emergency transfer switch 103 may indicate to an active emergency power source 102, such as a generator, by completing the connection between the emergency power source 102 and the emergency power line 105, and creating a power demand. The emergency transfer switch 103 may have other methods of wired or wireless communication to indicate to the emergency power source 102 to begin providing power, the emergency power source 102 may be capable of receiving the normal power active message 170A and further capable of noting the absence of the normal power active message 170A, thereby indicating a need for power from the emergency power source 102. The emergency power source 102 may also communicate with, or draw electricity from, the normal power source 101, and in the presence or absence of communication, or the absence of electrical power from the normal power source 101, the emergency power source 102 may provide electricity to the emergency transfer switch 103, and thereby the emergency power line 105. In general, the emergency transfer switch 103 is configured to provide power from the normal power source 101 to the emergency power line 105, determine that the normal power source 101 is interrupted such that power is no longer available via the normal power source 101, and, in response to determining that the normal power source is interrupted 101, provide power from the emergency power source 102 to the emergency power line 105.

Figure 2:
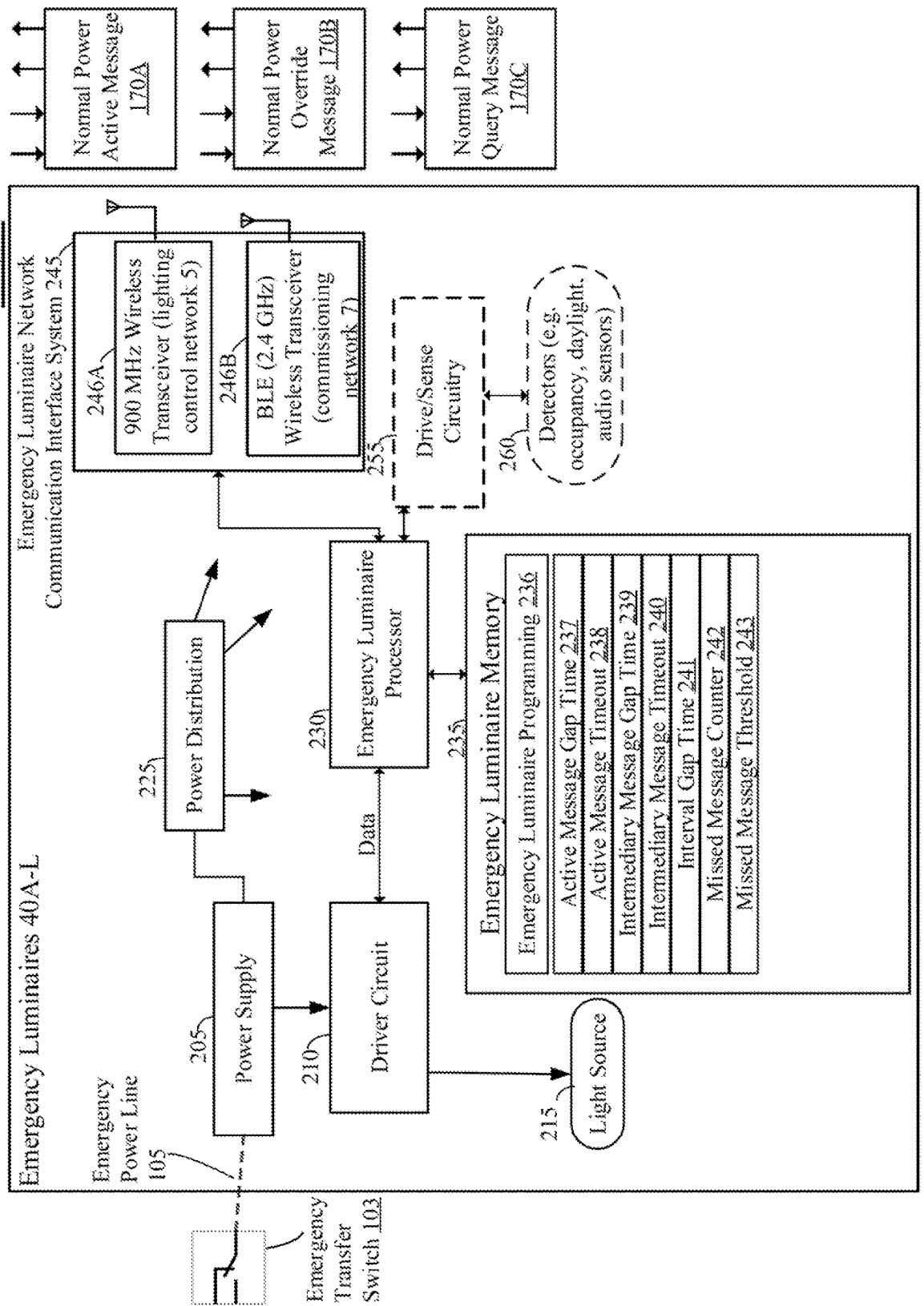
FIG. 2 is a block diagram of an emergency luminaire that is in the lighting control group that communicates via the lighting control system of FIG. 1.

The emergency luminaires 40A-L are capable of propagating the normal power active message 170A from the power monitor 11A to the other member devices 6A-O of the lighting control group 8. The emergency luminaires 40A-L, as provided in further detail in FIG. 2 and FIGS. 7A-B, are capable of monitoring the normal power active message 170A, and determining when the power monitor 11A has stopped sending the normal power active message 170A, indicating an emergency state. The non-emergency luminaires 10A-C are also are capable of propagating the normal power active message 170A from the power monitor 11A to the other member devices 6A-O of the lighting control group 8. However, in this example because the non-emergency luminaires 10A-C are solely powered by the normal power source 101 via the normal power line 104, the non-emergency luminaires 10A-C are not capable of entering an emergency state—they simply become unpowered.

Lighting control system 1 may be designed for indoor commercial spaces. As shown, lighting control system 1 includes a variety of lighting network elements, including non-emergency luminaires 10A-C and emergency luminaires 40A-L. Generally, the non-emergency luminaires 10A-C and emergency luminaires 40A-L execute a lighting application for communication over a wireless lighting control network communication band or channel, of control and systems operations information during lighting control network 5 operation over the lighting control network communication band or channel.

A lighting control group 8 includes a plurality of member devices 6A-P, which are shown as the power monitor 11A, emergency luminaires 40A-L, and non-luminaires 10A-C. Though not depicted, the lighting control group 8 may include occupancy, daylight, or audio sensors to enable controls for occupancy and dimming, as well such as a wall switch or touch screen device. Further lighting control group 8 members can include a plug load controller or a power pack 35.

As shown, each of the member devices 6A-P include an on-board micro-control unit (MCU) that includes a memory (volatile and non-volatile) and a central processing unit (CPU). As shown, the non-emergency luminaires 10A-C have an MCU coupled to a driver circuit that controls light source operation of a light source. Occupancy, daylight, or audio sensors added to the lighting control group 8 have an MCU coupled to drive/sense circuitry operable to control detectors. A power pack added to the lighting control group has an MCU operable to control a 0-10 Volt (V) dimming control signal.

Control, configuration, and maintenance operations of the lighting control system 1 involve networked collaboration between the emergency luminaires 40A-L, non-emergency luminaires 10A-C, and power monitor 11A that comprise the lighting control group 8. An installation in a physical space 2 on-premises (e.g., interior to a building or exterior) is comprised of one or more lighting control groups each operating independently of one another. One or more lighting control groups may exist in the lighting control network 5. Each lighting control group may have a power monitor 11A. However, in some examples, particularly where the power monitor 11A is installed close to the normal power source 101 on a main distribution line 601, the power monitor 11A may service multiple lighting control groups.

Emergency luminaires 40A-L, non-emergency luminaires 10A-C, and power monitor 11A communicate controls over a 900 MHz (sub-GHz) wireless lighting control network 5 and accordingly each include a first radio in the sub-GHz range. A variety of controls are transmitted over the lighting control network 5, including, for example, turn lights on/off, dim up/down, set scene (e.g., a predetermined light setting), and sensor trip events. In a first example, each of the emergency luminaires 40A-L, non-emergency luminaires 10A-C, and power monitor 11A are also equipped with a second near range Bluetooth Low Energy (BLE) radio that communicates over a separate commissioning network for the purposes of commissioning and maintenance of the lighting control system 1; however, no controls pass over this commissioning network. In a second example, lighting control network 5 and commissioning network are combined, such that both commissioning/maintenance and lighting controls pass over the GHz range wireless communication band (e.g., 2.4 GHz BLE). In the second example, each of the emergency luminaires 40A-L, non-emergency luminaires 10A-C, and power monitor 11A are only equipped with a near range Bluetooth Low Energy (BLE) radio.

The lighting control system 1 is provisioned with a mobile device that includes a commissioning/maintenance application for commissioning and maintenance functions of the lighting control system 1. For example, mobile device enables mobile commissioning, configuration, and maintenance functions and can be a PDA or smartphone type of device with human interfacing mechanisms sufficient to perform clear and uncluttered user directed operations. Mobile device runs mobile type applications on iOS7, Android KitKat, and windows 10 operating systems and commissioning/maintenance application to support commissioning.

Web enabled (cloud) services for facilitating commissioning and maintenance activities is also provided by mobile device. The commissioning/maintenance application of mobile device interfaces with the cloud services to acquire installation and configuration information for upload to the emergency luminaires 40A-L, non-emergency luminaires 10A-C, and power monitor 11A. The installation and configuration information is sent by mobile device to the gateway 50. The gateway 50 engages in communication through the wide area network (WAN) 55.

Lighting control system 1 can leverage existing sensor and fixture control capabilities of Acuity Brands Lighting's commercially available nLight® wired product through firmware reuse. In general, Acuity Brands Lighting's nLight® wired product provides the lighting control applications. However, the illustrated lighting control system 1 includes a communications backbone and includes model-transport, network, media access control (MAC)/physical layer (PHY) functions. The sub-GHz communications of the control network 5 features are built on a near 802.15.4 MAC and PHY implantation with network and transport features architected for special purpose control and air time optimizations to limit chatter.

Lighting control system 1 can be deployed in standalone or integrated environments. Lighting control system 1 can be an integrated deployment, or a deployment of standalone groups with no gateway 50. One or more groups of lighting control system 1 may operate independently of one another with no backhaul connections to other networks.

Lighting control system 1 may comprise a mix and match of various indoor systems, wired lighting systems (nLight® wired), emergency, and outdoor (dark to light) products that are networked together to form a collaborative and unified lighting solution. Additional control devices and lighting fixtures, gateway(s) 50 for backhaul connection, time sync control, data collection and management capabilities, and interoperation with the Acuity Brands Lighting's commercially available SensorView product may also be provided.

Groups are formed during commissioning of the lighting control system 1 where all members of the group are connected together over lighting control network 5, which in our example is a sub-GHz subnetwork defined by an RF channel and a lighting control group identifier 240.

The emergency luminaires 40A-L, non-emergency luminaires 10A-C, and power monitor 11A subscribe to channels and only listen for/react to messages on the RF channel with the identifier (ID) of the subscribed channel that designates the lighting control group 8 that the emergency luminaires 40A-L, non-emergency luminaires 10A-C, and power monitor 11A is a member of. For example, the emergency luminaires 40A-L, non-emergency luminaires 10A-C, and power monitor 11A subscribe to a multicast group as identified by the lighting control group identifier 240 and only react to messages on the RF channel of the lighting control group 8. Power monitor 11A can subscribe and cast in multiple groups, if power monitor 11A monitors the normal power source 101 for multiple lighting control groups 8 by being coupled to a main distribution line 601.

In general, lighting control groups do not share RF channels and thus form their own RF subnetwork, however with only twelve available channels some overlap is inevitable. Analysis and simulation have indicated that group distribution and spatial separation will mitigate the congestion and collision side effects that can occur when many emergency luminaires 40A-L, non-emergency luminaires 10A-C, and power monitors 11A share a singular RF enclave.

A group can be further divided to address control to specific control zones within the group defined by a control zone identifier. Zone communications are managed as addressable features at run time. Up to sixteen independent zones of control are available for each lighting control group and each lighting control group can support up to one hundred and twenty-eight addressable lighting system elements (emergency luminaires 40A-L, non-emergency luminaires 10A-C, and power monitor 11A).

The lighting control network 5 distributes control messages and events, network management messages and events, health and failover events, and group commissioning and maintenance communications, such as firmware update distributions and group membership changes.

Lighting control network 5 provides a secure control network (sub-GHz) on which to operate. Devices are manually added to the lighting control network 5 via the commissioning process via commissioning/maintenance application of a mobile device. The commissioning process includes authorization and authentication features that allow only trusted and known entities to add confirmed devices (emergency luminaires 40A-L, non-emergency luminaires 10A-C, and power monitor 11A) to the lighting control network 5. Requirements relating to network modification (device add/delete/modify) are allocated to the mobile device and its interface (commissioning/maintenance application) to the lighting control system 1.

Message authentication in the lighting control system 1 is provided by the 802.15.4 compliant MAC layer solution commercially available from Silicon Labs. The solution uses the AES CCM block cypher mode of operation to secure over the air frames. The mode of operation provides NIST compliant authentication, encryption, and integrity assurance to defeat replay attacks as well as device and message spoofing.

Lighting control system 1 also implements an additional layer of authentication by performing checks on the message source and addressing mechanisms to reject messages from unknown sources (i.e. sources that are not authorized members of a lighting control group network). An intrusion detection scheme using the above schemes and that reports such events will be made via the gateway 50. The sub-GHz MAC/PHY (lighting control network 5) thus provides secure communication features (authentication, data integrity, and encryption assurance) based on the 802.15.4 standard.

The emergency luminaires 40A-L, non-emergency luminaires 10A-C, and power monitor 11A of the lighting control group 8 together may engage in any-to-many (unicast, multicast, or broadcast) communication and can implement a non-mesh wireless network topology. In our example, lighting control network 5 is a star topology network. Although other network schemes may be utilized, a star topology may be the best fit for aligning the required control communications features with the characteristics of sub-GHz wireless radio.

The lighting control group 8 periodically checks the health of emergency luminaires 40A-L, non-emergency luminaires 10A-C, and power monitor 11A in the lighting control group 8. The lighting control group 8 runs a round robin check of each member device 6A-P such that every device receives a request to report health once every hour. In an example, given a group with a maximum number of devices (one hundred and twenty-eight), the lighting control group 8 will issue a request for health status every ~28.125 seconds while a group of six will result in a health request every 10 minutes.

Clock drift and frequency of over the air messaging are not expected to cause undesirable side effects or performance hits to the lighting control network 5, however health requests are delayed via a back off timer of 10 seconds during bursts of network traffic to allow potential congestions to clear and make way for higher priority control operations.

The lighting control group records faults reported by emergency luminaires 40A-L, non-emergency luminaires 10A-C, and power monitor 11A for later retrieval by commissioning/maintenance application of mobile device for commissioning and maintenance.

FIG. 2 is a block diagram of emergency luminaires 40A-L that are in the lighting control group 8 that communicates via the lighting control system 1 of FIG. 1. As noted above, the lighting control system 1 includes a lighting control group 8 including a plurality of member devices 6A-P. The member devices 6A-P include the emergency luminaires 40A-L, non-emergency luminaires 10A-C, and power monitor 11A.

In FIG. 2, drive/sense circuitry 255 and detectors 200 are optionally on-board the emergency luminaire 40A-L. Detectors 260 can be infrared sensors for occupancy or motion detection, an in-fixture daylight sensor, an audio sensor, a temperature sensor, or other environmental sensor. Drive/sense circuitry 255, such as application firmware, drives the occupancy, audio, and photo sensor hardware.

Emergency luminaire 40A-L includes a power supply 205 that is driven by the emergency power line 105, provided power by the normal power source 101 or the emergency power source 102 depending upon the current behavior of the emergency transfer switch 103.

Power supply 205 may include a magnetic transformer, electronic transformer, switching converter, rectifier, or any other similar type of circuit to convert an input power signal into a power signal suitable for light source 215. In the case of emergency luminaire 40A-L, the light source 215 is configured to continuously emit emergency illumination lighting during an emergency. The emergency illumination lighting can be configured by an operator of the lighting control system 1 in order to provide sufficient illumination while in emergency mode.

Light source 215 includes electrical-to-optical transducers include various light emitters, although the emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source. An LED light engine may use a single output for a single source but typically combines light from multiple LED type emitters within the single light engine. Light source 215 can include light emitting diodes (LEDs) that emit red, green, and blue (RGB) light or tunable white light. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

Emergency luminaire 40A-L further includes, a driver circuit 210, for example, an intelligent light emitting diode (LED) driver circuit. Driver circuit 210 is coupled to light source 215 and drives that EM device light source 215 by regulating the power to EM device light source 215 by providing a constant quantity or power to EM device light source 215 as its electrical properties change with temperature, for example. The driver circuit 210 provides power to light source 215. Driver circuit 210 may be a constant-voltage driver, constant-current driver, or AC LED driver type circuit that provides dimming through a pulse width modulation circuit and may have many channels for separate control of different LEDs or LED arrays that comprise light source 215. An example of a commercially available intelligent LED driver circuit 210 is manufactured by EldoLED®. In the case of emergency luminaire 40, the driver circuit 210 is coupled to the emergency luminaire light source 215 to control light source operation of the emergency luminaire light source 215.

Driver circuit 210 can further include an AC or DC current source or voltage source, a regulator, an amplifier (such as a linear amplifier or switching amplifier), a buck, boost, or buck/boost converter, or any other similar type of circuit or component. Driver circuit 210 outputs a variable voltage or current to the light source 215 that may include a DC offset, such that its average value is nonzero, and/or an AC voltage.

For purposes of communication and control, emergency luminaire 40A-L is treated as a single or a multi-addressable device that can be configured to operate as a member of the lighting control network 5. Emergency luminaire 40A-L includes power distribution circuitry 225 driven by the emergency power line 105, an emergency luminaire processor 230, and an emergency luminaire memory 235. As shown, emergency luminaire processor 230 is coupled to emergency luminaire network communication interface system 245 and driver circuit 210. Emergency luminaire processor 230 includes a central processing unit (CPU) that controls the light source operation of the light source 215. Emergency luminaire memory 235 of FIG. 2, power monitor memory 335 of FIG. 3, and non-emergency luminaire memory 435 of FIG. 4 can include volatile and non-volatile storage.

The power distribution circuitry 225 distributes power and ground voltages to the emergency luminaire processor 230, emergency luminaire memory 235, and an emergency luminaire network communication interface system 245 (e.g., wireless transceivers), drive/sense circuitry 255, and detector(s) 260 to provide reliable operation of the various circuitry on the emergency luminaire 40.

Figure 3:
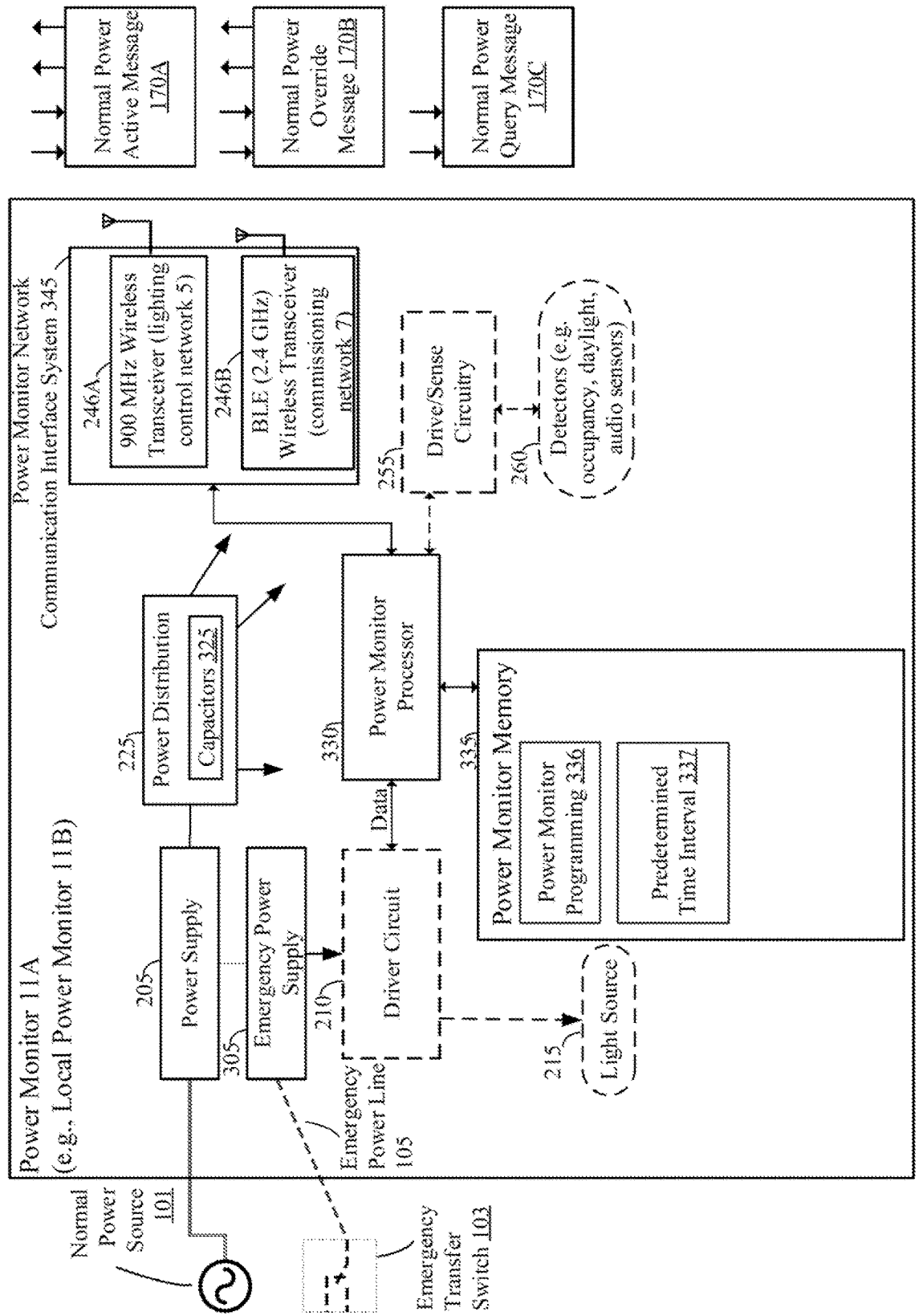
FIG. 3 is a block diagram of a power monitor of the lighting control group that communicates via the lighting control system of FIG. 1.
Figure 4:
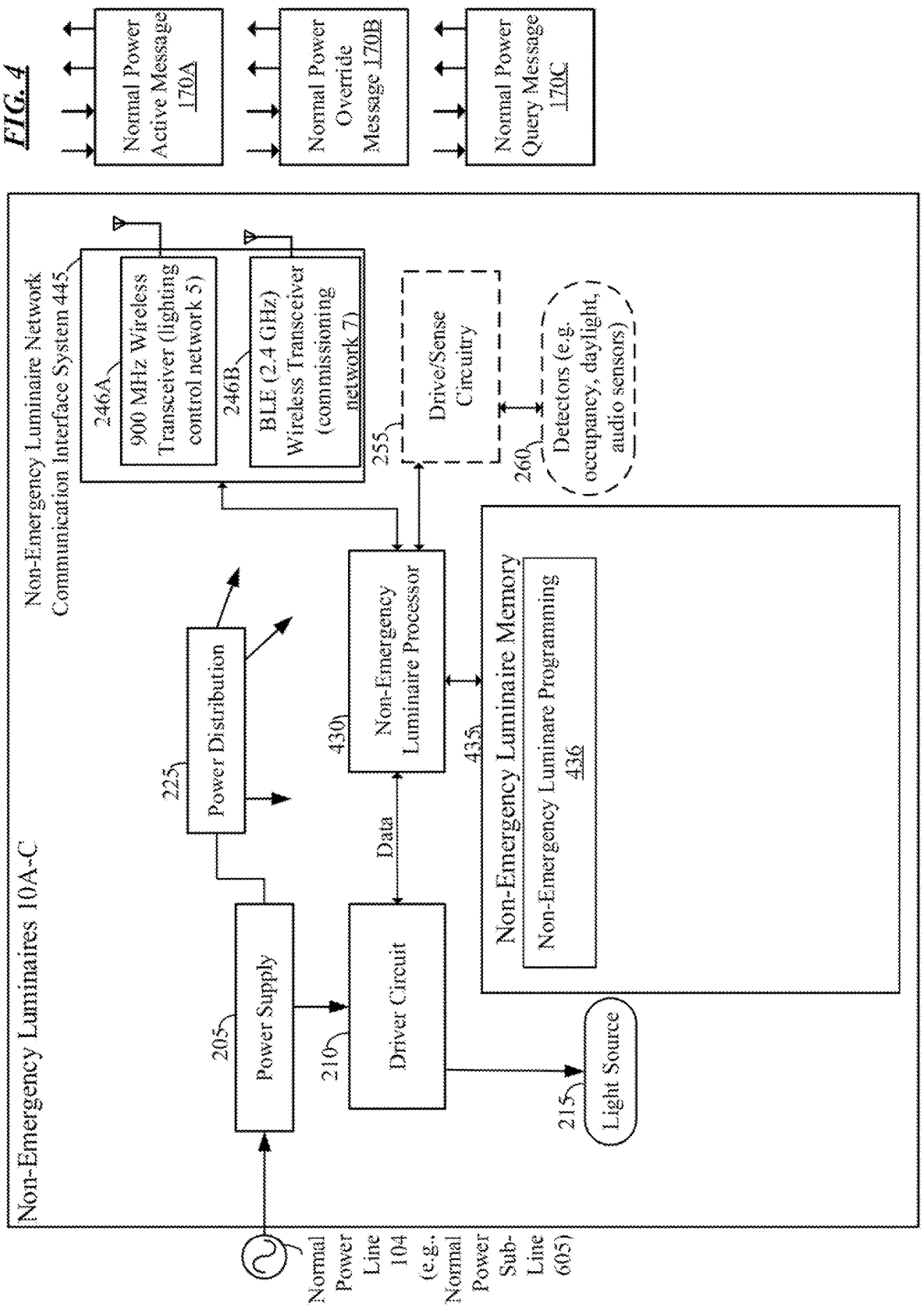
FIG. 4 is a block diagram of non-emergency luminaire of the lighting control group that communicate via the lighting control system of FIG. 1.

Emergency luminaire network communication interface system 245 of FIG. 2, power monitor network communication interface system 345 of FIG. 3, and non-emergency luminaire network communication interface system 445 of FIG. 4 allow for data communication (e.g., wired or wireless) over various networks, including the lighting control network 5 and the commissioning network 7. Network communication interface system 245, 345, 445 includes at least one transceiver, for example, a one band, dual-band, or tri-band chipset of wireless transceiver(s) 246A-B configured for wireless communication via separate radios that operate at three different frequencies, such as sub-GHz (e.g., 900 MHz), Bluetooth Low Energy (BLE) (2.4 GHz), and 5 GHz, for example. Alternatively, the at least one transceiver includes an Ethernet, RS-485, or other wired network transceiver, configured for wired communication. For example, network communication interface system 245, 345, 445 includes a first transceiver 246A configured for wireless communication (e.g., unicast and multicast) via a lighting control network 5 over a first lighting control network communication band (e.g., sub-GHz) for lighting control and systems operations (or information) with member devices 6B-P (e.g., emergency luminaire 4B-L, non-emergency luminaire 10A-C, and power monitor 11A) of the lighting control group 8. Network communication interface system 245, 345, 445 can include a second wireless transceiver 246B for communication (e.g., point-to-point) via the commissioning network with the mobile device for commissioning, over a second different commissioning network communication band (e.g., 1 GHz or above), of commissioning, configuration or maintenance operations (or information) other than the control and systems operations (or information).

Emergency luminaire processor 230 of the emergency luminaires 40A-L of FIG. 2, power monitor processor 330 of power monitor 11A of FIG. 3, and non-emergency luminaire processor 430 of non-emergency luminaires 10A-C of FIG. 4 serve to perform various operations, for example, in accordance with instructions or programming executable by processors 230, 330, 430. For example, such operations may include operations related to communications with various lighting control system 1 elements, such as emergency luminaires 40A-L, non-emergency luminaires 10A-C, and power monitor 11A during the dedicated keepalive normal power monitoring emergency protocol 700 procedure described herein. Although a processor 230, 330, 430 may be configured by use of hardwired logic, typical processors are general processing circuits configured by execution of programming. Processors 230, 330, 430 include elements structured and arranged to perform one or more processing functions, typically various data processing functions. Although discrete logic components could be used, the examples utilize components forming a programmable CPU. A processor 230, 330, 430 for example includes one or more integrated circuit (IC) chips incorporating the electronic elements to perform the functions of the CPU. The processors 230, 330, 430 for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in emergency luminaires 40A-L, non-emergency luminaires 10A-C, and power monitor 11A.

Emergency luminaire memory 235 of the emergency luminaires 40A-L of FIG. 2, power monitor memory 335 of power monitor 11A of FIG. 3, and non-emergency luminaire memory 435 of non-emergency luminaires 10A-C of FIG. 4 are for storing data and programming. In the example, the main memory system 235, 335, 435 may include a flash memory (non-volatile or persistent storage) and a random access memory (RAM) (volatile storage). The RAM serves as short term storage for instructions and data being handled by the processors 230, 330, 430, e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions, programming, or application(s) may be software or firmware used to implement any other device functions associated with emergency luminaires 40A-L, non-emergency luminaires 10A-C, and power monitor 11A. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 235, 335, 435 or a memory of a computer used to download or otherwise install such programming into the emergency luminaires 40A-L, non-emergency luminaires 10A-C, and power monitor 11A, or a transportable storage device or a communications medium for carrying program for installation in the emergency luminaires 40A-L, non-emergency luminaires 10A-C, and power monitor 11A.

As shown, the emergency luminaire 40A-L includes emergency luminaire programming 236 in the memory 235, which configures the processor 230 to control operations of the light source 215, including the communications over the network communication interface system 245. The emergency luminaire programming 236 implements the dedicated keepalive normal power monitoring emergency protocol 700 of FIGS. 7A-B. The emergency luminaire memory 235 also stores an active message gap time 237, indicating how long it has been since the respective emergency luminaire 40A has received the normal power active message 170A. The active message gap time 237 is reset every time the respective emergency luminaire 40A receives a unique normal power active message 170A.

The emergency luminaire memory 235 further comprises an active message timeout 238, which is a threshold value (in this example ten seconds.) The active message gap time 237 is compared to the active message timeout 238, and if the active message gap time 237 exceeds the active message timeout 238, then the respective emergency luminaire 40A enters an emergency state.

The emergency luminaire memory can additionally include an intermediary message gap time 239, which also indicating how long it has been since the respective emergency luminaire 40A has received the normal power active message 170A. The intermediary message gap time 239 and the active message gap time 237 can be the same timer in the emergency luminaire memory 235, as they count time at the same rate, and reset at the same action (receiving a normal power active message 170A.) Paired with the intermediary message gap time 239 is an intermediary message timeout 240 which is a threshold value lower than the active message timeout 238 (in this example eight seconds.) The intermediary message gap time 239 is compared to the intermediary message timeout 240, and if the intermediary message gap time 239 exceeds the intermediary message timeout 240, the respective luminaire 40A sends a normal power query message 170C to the lighting control group 8, to confirm that the respective luminaire 40A did not miss a normal power active message 170A generated by the power monitor 11A. If the respective luminaire 40A does not receive a normal power active message 170A between sending the normal power query message 170C and the active message gap time 237 exceeding the active message timeout 238, then the respective emergency luminaire 40A enters an emergency state.

As an alternative, rather than timing the timespan since a normal power active message 170A was received in order to determine whether to enter an emergency state, the emergency luminaires 40A-L may instead count missed messages. In such an example, the emergency luminaire memory 235 includes an interval gap time 241, which is equal to the predetermined time interval 337 between normal power active messages 170A when the power monitor 11A receives power from the normal power source 101 (in this example four seconds.) The predetermined time interval 337 can be a time interval which is fixed, a time interval which is configurable by a user or operator, a time interval which is determined by a commissioning algorithm when the lighting control system 1 is commissioned, a time interval which is determined when the power monitor 11A is commissioned, or a time interval determined by an optimization algorithm which optimizes automatically over time. The interval gap time 241 is compared to the predetermined time interval 337, and if the interval gap time 241 exceeds the predetermined time interval 337, the respective emergency luminaire 40A determines whether it has received a normal power active message 170A during the predetermined time interval 337. If the respective emergency luminaire 40A has received a normal power active message 170A, then a missed message counter 242 in the emergency luminaire memory 235, which tracks the number of consecutive missed normal power active messages 170A, is set to zero. If the respective emergency luminaire 40A has not received a normal power active message 170A, then the missed message counter 242 is incremented. At this point, if the missed message counter 242 exceeds a missed message threshold 243, which is a number of acceptable missed consecutive normal power active messages 170A, then the respective luminaire 40A enters an emergency state. In this example, the missed message threshold 243 is one—this allows for one missed normal power active message 170A to not trigger an emergency state. However, two consecutive missed normal power active messages 170A would put the emergency luminaire 40A-L into an emergency state. As an alternative, once the missed message threshold is met or exceeded, the respective emergency luminaire 40A can send a normal power query message 170C, and wait until either the predetermined time interval 337 elapses, the active message timeout 238 is exceeded, the intermediary message timeout 240 is exceeded, or some other span of time such as almost 2 seconds is exceeded.

The emergency luminaires 40A-L can receive and transmit several types of messages. The normal power active message 170A when received indicates that the normal power source 101 is providing electricity to the lighting control system. The emergency luminaires 40A-L can forward this normal power active message 170A on to other members of the lighting control group 8, in particular those out of the broadcast range of the power monitor 11A. The normal power override message 170B indicates to a recipient emergency luminaire 40A-L that the recipient emergency luminaire 40A-L should immediately enter an emergency state, without waiting for additional timers or messages. The normal power override message 170B is generally originated at the power monitor 11A if the power monitor 11A has power, and has determined that the normal power source 101 is no longer providing electricity. The emergency luminaires 40A-L can forward this normal power override message 170B on to other members of the lighting control group 8, in particular those out of the broadcast range of the power monitor 11A. The normal power query message 170C when received indicates that a neighboring emergency luminaire 40A-L is imminently going to enter an emergency state, and is seeking a confirmation of (in the form of a normal power override message 170B) of a loss of normal power, or seeking a correction (in the form of a normal power active message 170A) that there has been no loss of normal power. The emergency luminaires 40A-L can respond to the normal power query message 170C based on whether the responding emergency luminaire 40A-L is in an emergency state: the responding emergency luminaire 40A-L does not need to forward to and receive a response from the power monitor 11A explicitly before responding to the normal power query message 170C.

Emergency luminaire programming 236 of FIG. 2, power monitor programming 336 of FIG. 3, and non-emergency luminaire programming 436 of FIG. 4 is firmware/software that engages in communications with the member devices 6A-P in the lighting control group 8 of the lighting control system 1, including emergency luminaires 40A-L, non-emergency luminaires 10A-C, and power monitor 11A to implement the dedicated keepalive normal power monitoring emergency protocol 700 for emergency luminaires 40A-L. Emergency luminaire programming 236 of FIG. 2, power monitor programming 336 of FIG. 3, and non-emergency luminaire programming of FIG. 4 can also operate the driver circuit 210 to control light source 215; operate drive/sense circuitry 255 to control detectors 260 and switches 261; and engage in network communications within the lighting control system 1.

Execution of the emergency luminaire programming 236 by the emergency luminaire 40A-L configures the emergency luminaire 40A to implement the following functions. First, track the active message gap time 237. Second, in response to receiving the normal power active message 170A from another member device 6B-P before the tracked active message gap time 237 exceeds the active message timeout 238, reset the active message gap time 237. Third, in response to the tracked active message gap time 237 exceeding the active message timeout 238, enter an emergency mode (EM) active state by controlling the emergency luminaire light source 215, via the emergency luminaire driver circuit 210, to continuously emit the emergency illumination lighting. Fifth, in response to receiving the normal power override message 170B from another member device 6B-P, enter the emergency mode active state by controlling the emergency luminaire light source 215, via the emergency luminaire driver circuit 210, to continuously emit the emergency illumination lighting. Optionally sixth, in response to receiving the normal power active message 170A from another member device 6B-P, exit the EM active state by controlling the emergency luminaire light source 215, via the emergency luminaire driver circuit 210, to stop continuously emitting the emergency illumination lighting.

Additionally, the emergency luminaire 40A can implement the following functions. First, track the intermediary message gap time 239. Second, in response to receiving the normal power active message 170A from another member device 6B-P before the tracked intermediary message gap time 239 exceeds the intermediary message timeout 240, reset the intermediary message gap time 239. Third, in response to the tracked intermediary message gap time 239 exceeding the intermediary message timeout 240, transmit, via the lighting control network 5, a normal power query message 170C to the lighting control group 8. Fourth, in response to receiving the normal power query message 170C from another member device 6B-P, determine whether the emergency luminaire 40A has entered the EM active state. Fifth, in response to determining that the emergency luminaire 40A has entered the EM active state, transmit, via the lighting control network 5, a normal power override message 170B to the lighting control group 8. Sixth, in response to determining that the emergency luminaire 40A has not entered the EM active state, transmit, via the lighting control network 5, the normal power active message 170A to the lighting control group 8.

Furthermore, the emergency luminaire 40A can implement the following functions.

First, track the interval gap time 241. Second, in response to tracking the interval gap time 241, track the normal power active message 170A received from another member device 6B-P. Third, in response to the tracked interval gap time 241 exceeding the predetermined time interval 337, determine whether the tracked normal power active message 170A was received from another member device 6B-P. Fourth, in response to determining the tracked normal power active message 170A was received from another member device 6B-P, reset the missed message counter 242. Fifth, in response to determining the tracked normal power active message 170A was not received from another member device 6B-P, increment the missed message counter 242. Sixth, in response to the missed message counter 242 exceeding the missed message threshold 243, transmit, via the lighting control network 5, a normal power query message 170C to the lighting control group.

FIG. 3 is a block diagram of a power monitor 11A of the lighting control group 8 that communicates via the lighting control system 1 of FIG. 1. The circuitry, hardware, and software of the power monitor 11A shown is similar to the emergency luminaires 40A-L and non-emergency luminaires 10A-C. However, as shown, power monitor 11A can include a subset of the circuitry, hardware, and software shown for the emergency luminaire 40A-L of FIG. 2.

Power monitor 11A includes a power supply 205, which is powered by a line power source 301 or a non-line power source 201. The power supply 205 of the power monitor 11A can be powered by the line power source 301, the non-line power source 201, or both.

Power monitor 11A includes a power monitor network communication interface system 345 including at least one transceiver 246A-B configured for communication via the lighting control network 5 over the lighting control network communication channel for lighting control and systems operations like element 245 of FIG. 2. Power monitor 11A can optionally include driver circuit 210, light source 215, drive/sense circuitry 255, and detectors 260 like that of FIG. 2.

Power monitor 11A includes a power monitor processor 330 coupled to the power monitor network communication interface system 345 and a power monitor memory 335 accessible to the power monitor processor 330. Power monitor 11A includes power monitor programming 336 in the power monitor memory 335.

The power monitor memory 335 also stores a predetermined time interval 337, in this example four seconds. Every time the predetermined time interval elapses, and the power monitor 11A is capable, the power monitor transmits a normal power active message 170A to the lighting control group 8. Additionally, upon receiving a normal power query message 170C, the power monitor 11A can send a special normal power active message 170A, without regard for the predetermined time interval 337. The special normal power active message 170A may be tagged as such, in order to not upset counting operations within other members of the lighting control group 8.

Execution of the power monitor programming 336 by the power monitor processor 330 configures the power monitor 11A to implement the following functions. First, transmit, via the lighting control network 5, a normal power active message 170A to the lighting control group 8 repeatedly at a predetermined time interval 337.

In some examples the power monitor processor 330 configures the power monitor 11A to implement the following additional functions. First, determine that the normal power source 101 is interrupted such that power is no longer available via the normal power source 101. Second, in response to determining that the normal power source 101 is interrupted, transmit a normal power override message 170B. In examples where the power monitor 11A is solely powered by the normal power source 101, the power monitor 11A can nevertheless send out the normal power override message 170B utilizing the residual energy within the power monitor 11A. The residual energy is depicted and described as being stored in capacitors 325 within the power distribution 225, but the residual energy can be stored in inherent capacitance within any component of the power monitor 11A; in particular, the power monitor processor 330, power monitor memory 335, and the power monitor network communication interface system 345.

FIG. 4 is a block diagram of non-emergency luminaires 10A-C of the lighting control group 8 that communicate via the lighting control system 1 of FIG. 1. The circuitry, hardware, and software of the non-emergency luminaires 10A-C shown is similar to the emergency luminaires 40A-L of FIG. 2. However, as shown, normal luminaires 10B-D include a power supply 205, which is powered by a normal power line 104, or a normal power sub-line as further described in FIG. 6.

Non-emergency luminaires 10A-C include a non-emergency luminaire network communication interface system 445 including at least one transceiver 246A-B configured for communication via the lighting control network 5 over the lighting control network communication channel for lighting control and systems operations like element 245 of FIG. 2. Non-emergency luminaires 10A-C can optionally include driver circuit 210, light source 215, drive/sense circuitry 255, and detectors 260 like that of FIG. 2.

Non-emergency luminaire 10A-C include a non-emergency luminaire processor 430 coupled to the non-emergency luminaire network communication interface system 445 and a non-emergency luminaire memory 435 accessible to the non-emergency luminaire processor 430. Non-emergency luminaire 10A-C include non-emergency luminaire programming 436 in the non-emergency luminaire memory 435.

Execution of the non-emergency luminaire programming 436 by non-emergency luminaire processor 430 configures the non-emergency luminaire 10A-C to implement functions to in response to receiving, via the non-emergency luminaire network communication interface system 445, a normal power active message 170A, or a normal power override message 170B line power sensor 402, transmit, via the lighting control network 5, the received normal power active message 170A or the received normal power override message 170B. Additionally, in response to receiving the normal power query message 170C from another member device 6B-P, determine whether the non-emergency luminaire 10A has entered the EM active state. Next, in response to determining that the non-emergency luminaire 10A has entered the EM active state, transmit, via the lighting control network 5, a normal power override message 170B to the lighting control group 8. Alternatively, in response to determining that the non-emergency luminaire 10A has not entered the EM active state, transmit, via the lighting control network 5, the normal power active message 170A to the lighting control group 8.

The lighting control system 1 may also have other control devices in the lighting control group 8, capable of broadcasting, transmitting, and forwarding the normal power active message 170A, normal power override message 170B, and normal power query message 170C. These other control devices may take the form of a group monitor, power monitor, relay, or 0-10V dimming control, and will include a subset of components of the non-emergency luminaires 10A-C, such as the non-emergency luminaire network communication interface system 445, and the non-emergency luminaire programming 436. For the purposes of executing the dedicated keepalive normal power monitoring emergency protocol 700 of FIG. 7, these other control devices are treated the same as non-emergency luminaires 10A-C of the lighting control system 1.

Therefore FIGS. 1-4 describe a lighting control system 1 including a lighting control group 8 including a plurality of member devices 6A-P, the member devices 6A-P including a power monitor 11A and an emergency luminaire 40A. The power monitor 11A includes a power monitor network communication interface system 345 including at least one transceiver 246A configured for communication via a lighting control network 5 over a lighting control network communication channel for lighting control and systems operations. A power monitor 11A power supply 205 driven by a normal power source 101. A power monitor processor 330 coupled to the power monitor network communication interface system 345. A power monitor memory 335 accessible to the power monitor processor 330. Power monitor programming 336 in the power monitor memory 345, wherein execution of the power monitor programming 336 by the power monitor processor 339 configures the power monitor 11A to implement the following functions. First, transmit, via the lighting control network 5, a normal power active message 170A to the lighting control group 8 repeatedly at a predetermined time interval 337. The emergency luminaire 40A includes an emergency luminaire network communication interface system 245 including at least one transceiver 246A configured for communication via the lighting control network 5 over the lighting control network communication channel for lighting control and systems operations. An emergency luminaire 40A light source 215 to continuously emit emergency illumination lighting during an emergency. An emergency luminaire 40A driver circuit 210 coupled to the emergency luminaire 40A light source 215 to control light source operation of the emergency luminaire light source. An emergency luminaire 40A power supply 205 driven by an emergency power line 105. An emergency luminaire processor 230 coupled to the emergency luminaire network communication interface system 245 and the emergency luminaire 40A driver circuit 210. An emergency luminaire memory 235 accessible to the emergency luminaire processor 230 and including an active message gap time 237 and an active message timeout 238. Emergency luminaire programming 236 in the emergency luminaire memory 235, wherein execution of the emergency luminaire programming 236 by the emergency luminaire processor 230 configures the emergency luminaire 40A to implement the following functions. First, track the active message gap time 237. Second, in response to receiving the normal power active message 170A from another member device 6B-P before the tracked active message gap time 237 exceeds the active message timeout 238, reset the active message gap time 237. Third, in response to the tracked active message gap time 23 exceeding the active message timeout 238, enter an emergency mode (EM) active state by controlling the emergency luminaire 40A light source 215, via the emergency luminaire 40A driver circuit 210, to continuously emit the emergency illumination lighting.

Additionally, in the lighting control system 1 the normal power active message 170A is received, via the lighting control network 5, as a multicast normal power active packet or a broadcast normal power active packet. The other member device 6P is the power monitor 11A. The active message timeout 238 is more than twice as long as the predetermined time interval 337. In a particular example, the active message timeout 238 is less than or equal to ten seconds, and the predetermined time period 337 is less than or equal to four seconds.

In some examples of the lighting control system 1, execution of the emergency luminaire programming 236 by the emergency luminaire processor 230 further configures the emergency luminaire 40A to implement functions to, in response to receiving the normal power active message 170A from another member device 6B-P, exit the EM active state by controlling the emergency luminaire 40A light source 215, via the emergency luminaire 40A driver circuit 210, to stop continuously emitting the emergency illumination lighting.

Furthermore, FIGS. 1-4 describe the light control system 1 as including a normal power line 104, an emergency power source 102, and an emergency transfer switch 103. The normal power source 101 is coupled to the normal power line 104 and the emergency transfer switch 103. The emergency power source 102 is coupled to the emergency transfer switch 103. The emergency transfer switch 103 is coupled to the emergency power line 105. The emergency transfer switch 105 is configured to provide power from the normal power source 101 to the emergency power line 105. To determine that the normal power source 101 is interrupted such that power is no longer available via the normal power source 101. To, in response to determining that the normal power source 101 is interrupted, provide power from the emergency power source 102 to the emergency power line 105.

In some of the examples the light control system 1 is described such that the power monitor 11A further includes one or more capacitors 325 with a stored capacitance. Execution of the power monitor programming 336 by the power monitor processor 330 further configures the power monitor 11A to implement the following functions. First, determine that the normal power source 101 is interrupted such that power is no longer available via the normal power source 101. Second, in response to determining that the normal power source 101 is interrupted, transmit a normal power override message 170B. Execution of the emergency luminaire programming 236 by the emergency luminaire processor 230 further configures the emergency luminaire 40A to implement the following functions. First, in response to receiving the normal power override message 170B from another member device 6B-P, enter the EM active state by controlling the emergency luminaire 40A light source 215, via the emergency luminaire 40A driver circuit 210, to continuously emit the emergency illumination lighting. While the normal power source 101 is interrupted, the power monitor 11A is powered by the stored capacitance of the one or more capacitors 325.

An alternative of the light control system 1 is described such that the emergency luminaire memory 230 further includes an intermediary message gap time 239 and an intermediary message timeout 240. Execution of the emergency luminaire programming 236 by the emergency luminaire processor 230 further configures the emergency luminaire to implement the following functions. First, track the intermediary message gap time 239. Second, in response to receiving the normal power active message 170A from another member device 6B-P before the tracked intermediary message gap time 239 exceeds the intermediary message timeout 240, reset the intermediary message gap time 239. Third, in response to the tracked intermediary message gap time 239 exceeding the intermediary message timeout 240, transmit, via the lighting control network 5, a normal power query message 170C to the lighting control group 8. Fourth, in response to receiving the normal power query message 170C from another member device 6B-O, determine whether the emergency luminaire 40A has entered the EM active state. Fifth, in response to determining that the emergency luminaire 40A has entered the EM active state, transmit, via the lighting control network 5, a normal power override message 170B to the lighting control group 8. Sixth, in response to determining that the emergency luminaire 40A has not entered the EM active state, transmit, via the lighting control network 5, the normal power active message 170A to the lighting control group. Seventh, in response to receiving the normal power override message 170B from another member device 6B-P, enter the EM active state by controlling the emergency luminaire 40A light source 215, via the emergency luminaire 40A driver circuit 210, to continuously emit the emergency illumination lighting.

A second alternative of the light control system is described such that the emergency luminaire memory 235 further includes a missed message counter 242, a missed message threshold 243, and an interval gap time 241. Execution of the emergency luminaire programming 236 by the emergency luminaire processor 230 further configures the emergency luminaire 40A to implement the following functions. First, track the interval gap time 241. Second, in response to tracking the interval gap time 241, track the normal power active message received 170A from another member device 6B-P. Third, in response to the tracked interval gap time 241 exceeding the predetermined time interval 242, determine whether the tracked normal power active message 170A was received from another member device 6B-P. Fourth, in response to determining the tracked normal power active message 170A was received from another member device 6B-P, reset the missed message counter 242. Fifth, in response to determining the tracked normal power active message 170A was not received from another member device 6B-P, increment the missed message counter 242. Sixth, in response to the missed message counter 242 exceeding the missed message threshold 243, transmit, via the lighting control network 5, a normal power query message 170C to the lighting control group 8. Seventh, in response to receiving the normal power query message 170C from another member device 6B-O, determine whether the emergency luminaire 40A has entered the EM active state. Eighth, in response to determining that the emergency luminaire 40A has entered the EM active state, transmit, via the lighting control network 5, a normal power override message 170B to the lighting control group 8. Ninth, in response to determining that the emergency luminaire 40A has not entered the EM active state, transmit, via the lighting control network 5, the normal power active message 170A to the lighting control group 8. Tenth, in response to receiving the normal power override message 170B from another member device 6B-P, enter the EM active state by controlling the emergency luminaire 40A light source 215, via the emergency luminaire 40A driver circuit 210, to continuously emit the emergency illumination lighting. In some examples, the missed message threshold 243 is one, and the fourth function to reset the mixed message counter 242 resets the missed message counter 242 to zero.

FIG. 5 is a high-level functional block diagram of an alternative example of a lighting control system 1 that includes twelve emergency luminaires 40A-L, three non-emergency luminaires 10A-C, and a power monitor 11A and supports a dedicated keepalive normal power monitoring emergency protocol 700 (see FIGS. 7A-B) for emergency illumination lighting. FIG. 5 is substantially similar to FIG. 1, except for the fact that the power monitor 11A receives power from both the emergency power line 105 and the normal power line 104. This enables the power monitor 11A to send a normal power override message 170B and perform other general messaging functions when the normal power source 101 is not providing power. The power monitor 11A can be powered by both the normal power line 104 and the emergency power line 105, or the power monitor 11A can be powered by the emergency power line 105, and merely sense the power in the normal power line 104.

Therefore, FIG. 5 describes the lighting control system 1 of FIG. 1, but the power monitor 11A further includes a power monitor emergency power supply 305 driven by the emergency power line 105. Execution of the power monitor programming 336 by the power monitor processor 330 further configures the power monitor 11A to implement the following functions. First, determine that the normal power source 101 is interrupted such that power is no longer available via the normal power source 101. Second, in response to determining that the normal power source 101 is interrupted, transmit a normal power override message 170B. Execution of the emergency luminaire programming 336 by the emergency luminaire processor 330 further configures the emergency luminaire 40A to implement the following functions. First, in response to receiving the normal power override 170B message from another member device 6B-P, enter the EM active state by controlling the emergency luminaire 40A light source 215, via the emergency luminaire 40A driver circuit 210, to continuously emit the emergency illumination lighting.

FIG. 6 is a high-level functional block diagram of an alternative example of a lighting control system 1 that includes twelve emergency luminaires 40A-L, three non-emergency luminaires 10A-C, and a power monitor 11A and supports a dedicated keepalive normal power monitoring emergency protocol 700 (see FIGS. 7A-B) for emergency illumination lighting. FIG. 6 is substantially similar to FIG. 1. FIG. 6 differs in that the non-emergency luminaires 10A-C are connected to the emergency transfer switch 103, and therefore get power even in an emergency state. Consequently, to detect whether the normal power source 101 is providing power, the power monitor 11A needs to still be coupled between the emergency transfer switch 103 and the normal power source 101, on a main distribution line 601. In this example, the main distribution line 601 is the segment of the normal power line 101 between the normal power source 101 and the emergency transfer switch 103.

Therefore, FIG. 6 describes the lighting control system of FIG. 1 excepting that the normal power source 101 is coupled to an emergency transfer switch 103 by a main distribution line 601. The emergency power line 105 is coupled to the emergency transfer switch 103. The power monitor power supply 205 of the power monitor 11A is coupled to the main distribution line 601.

Additionally, the emergency power lone 105 is split into an emergency power sub-line 605 and a normal power sub-line 604. The emergency power sub-line 605 feeds power to the emergency luminaires 40A-L, and the normal power sub-line 604 feeds power to the non-emergency luminaires. However, the normal power sub-line 604 also has a local power monitor 11B connected. The local power monitor 11B is the same as the power monitor 11A, excepting that the local power monitor 11B only detects power outages within the lighting control group 8, as opposed to the power monitor 11A which, as it is fed by the main distribution line 601, will detect power outages across all devices fed by the normal power source 101, which may include multiple lighting control groups 8. As an example, the power monitor 11B may have all of the luminaires 10A-C on the first floor of a building in the lighting control group 8, whereas the power monitor 11A may report normal power source outages to every luminaire within the entire building.

Therefore, FIG. 6 also describes the lighting control system 1 of FIG. 1, further including a normal power line 104, an emergency power source 102, and an emergency transfer switch 103. The normal power line 104 is coupled between the normal power source 101 and the emergency transfer switch 103. The power monitor 11A power supply 205 is driven by the normal power source 101 via the normal power line 104. The emergency power source 102 is coupled to the emergency transfer switch 103. The emergency transfer switch 103 is coupled to the emergency power line 105. The emergency transfer switch 103 is configured to provide power from the normal power source 101 to the emergency power line 105. To determine that the normal power source 101 is interrupted such that power is no longer available via the normal power source 101. To, in response to determining that the normal power source 101 is interrupted, provide power from the emergency power source to the emergency power line 105.

Additionally, the lighting control system 1 is described such that the plurality of member devices 6B-P further includes a non-emergency luminaire 10A, the non-emergency luminaire 10A including a non-emergency luminaire 10A light source 215 and a non-emergency luminaire 10A power supply 205 driven by the emergency power line 105.

Furthermore, the lighting control system 1 further includes a normal power sub-line 604 and an emergency power sub-line 605. The normal power sub-line 605 is coupled to the emergency power line 105. The emergency power sub-line 605 is coupled to the emergency power line 105. The emergency luminaire 40A power supply 205 is driven by the emergency power line 105 via the emergency power sub-line 605. The non-emergency luminaire 10A power supply 205 is driven by the emergency power line 105 via the normal power sub-line 604. The plurality of member devices 6B-Q further includes a local power monitor 11B.

The local power monitor 11B includes a local power monitor 11B network communication interface system 345 including at least one transceiver 246A configured for communication via the lighting control network 5 over the lighting control network communication channel for lighting control and systems operations to the member devices. A local power monitor 11B power supply 205 driven by the emergency power line 105 via the normal power-sub-line 604. A local power monitor 11B processor 330 coupled to the local power monitor 11B network communication interface system 345. A local power monitor 11B memory 325 accessible to the local power monitor 11B processor 330. Power monitor programming 336 in the local power monitor 11B memory 345, wherein execution of the power monitor programming 336 by the local power monitor 11B processor 330 configures the local power monitor 11B to implement the following functions. First, transmit, via the lighting control network 5, the normal power active message 170A to the lighting control group 8 repeatedly at a predetermined time interval 337.

FIGS. 7A-B depict a dedicated keepalive normal power monitoring emergency protocol 700 for supporting emergency luminaires 40A-L entering an emergency mode active state upon loss of normal power. Beginning in block 703, the emergency luminaire 40A-L is trying to determine whether the power monitor 11A has stopped sending messages and whether the emergency luminaire 40A-L should enter an emergency mode active state. First, the emergency luminaire 40A tracks an active message gap time 237. Next, in response to receiving the normal power active message 170A from a member device 6B-P before the tracked active message gap time 237 exceeds an active message timeout 238, the emergency luminaire 40A resets the active message gap time 237 in block 706. However as an alternative if, in block 709, the tracked active message gap time 237 exceeds the active message timeout 238, then proceeding to block 712 has the emergency luminaire 40A enter an emergency mode (EM) active state by controlling an emergency luminaire 40A light source 215, via an emergency luminaire 40A driver circuit 210, to continuously emit emergency illumination lighting. As another alternative, the emergency luminaire 40A-L should enter the emergency mode active state when directed to by the power monitor 11A. Therefore, in block 715 states that in response to receiving the normal power override message 170B from a member device 6B-P, the protocol should move to block 712, and the emergency luminaire 40A should enter the emergency mode active state.

In block 718, the emergency luminaire 40A-L is trying to determine whether the respective emergency luminaire 40A has missed the normal power active message 170A from the power monitor 11A. First, the emergency luminaire 40A tracks an intermediary message gap time 239. Next, in response to receiving the normal power active message 170A from a member device 6B-P before the tracked intermediary message gap time 239 exceeds an intermediary message timeout 240, the emergency luminaire 40A resets the intermediary message gap time 239 in block 721. However as an alternative if in block 724 the tracked intermediary message gap time 239 exceeds the intermediary message timeout 240, the emergency luminaire 40A transmits, via the lighting control network 5, a normal power query message 170C to the lighting control group 8.

In block 727, the emergency luminaire 40A-L is trying to determine how to respond to a received normal power query message 170C. First, in response to receiving the normal power query message 170C from the member device 6B-P, the emergency luminaire 40A determines whether the emergency luminaire 40A has entered the EM active state. In block 730, in response to determining that the emergency luminaire 40A has entered the EM active state, the emergency luminaire 40A transmits, via the lighting control network 5, a normal power override message 170B to the lighting control group 8. Alternatively, in block 733, in response to determining that the emergency luminaire 40A has not entered the EM active state, transmitting, via the lighting control network 5, a normal power active message 170A to the lighting control group 8.

In block 736 the emergency luminaire 40A-L is trying to determine whether the respective emergency luminaire 40A has missed the normal power active message 170A from the power monitor 11A by counting missed normal power active messages 170A rather than timing missed normal power active messages 170A. First, the emergency luminaire 40A tracks an interval time gap 241. Next, in block 739, the emergency luminaire 40A tracks the normal power active message 170A received from a member device 6B-P. the emergency luminaire 40A may not receive any normal power active messages 170A, and so the emergency luminaire 170A will track this lack of normal power active messages 170A. In block 742, in response to the tracked interval gap time 241 exceeding a predetermined time interval 377, determine whether the tracked normal power active message 170A was received from the member device 6B-P. Because the power monitor 11A transmits a normal power active message 170A every predetermined time interval 377, the emergency luminaire 40A should receive a normal power active message 170A every predetermined time interval 377: either directly from the power monitor 11A, or indirectly from another member device 6B-O. In response to determining the tracked normal power active message 170A was received from the member device 6B-P, in block 745 the emergency luminaire 40A resets a missed message counter 243. Alternatively, in response to determining the tracked normal power active message 170A was not received from the member device 6B-P, in step 748 the emergency luminaire 40A increments the missed message counter 243. Next, in block 751, in response to the missed message counter 243 exceeding a missed message threshold 242, the emergency luminaire 40A transmits, via the lighting control network 5, a normal power query message 170A to the lighting control group 8.

In block 754, the power monitor 11A is trying to provide power to the emergency power line 105. First, the emergency transfer switch 103 provides power from a normal power source 101 to an emergency power line 105. Next, in block 757, the power monitor 11A transmits, via a lighting control network 5, a normal power active message 170A to a lighting control group 8 repeatedly at a predetermined time interval 377. Alternatively, in block 760 the power monitor 11A determines that the normal power source 101 is interrupted such that power is no longer available via the normal power source 101. Next, the power monitor 11A transmits a normal power override message in block 763, and additionally the emergency transfer switch 103 provides power from an emergency power source 103 to the emergency power line 105 in block 766.

Any of the steps or functionality of the automatic emergency mode exit network protocol 900, described herein for member devices 6A-Y of the lighting control group 8 of the lighting control system 1 can be embodied in programming or one more applications as described previously. This includes, for example, EM device programming 236, power monitor programming 336, and non-EM device programming 436. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++), procedural programming languages (e.g., C or assembly language), or firmware. In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A lighting control system comprising:
  a lighting control group including a plurality of member devices, the member devices including a power monitor and an emergency luminaire wherein the power monitor includes:
  a power monitor network communication interface system including at least one transceiver configured for communication via a lighting control network over a lighting control network communication channel for lighting control and systems operations;
  a power monitor power supply driven by a normal power source;
  a power monitor processor coupled to the power monitor network communication interface system;
  a power monitor memory accessible to the power monitor processor; and
  power monitor programming in the power monitor memory, wherein execution of the power monitor programming by the power monitor processor configures the power monitor to implement functions, including functions to:

transmit, via the lighting control network, a normal power active message to the lighting control group repeatedly at a predetermined time interval;

wherein the emergency luminaire includes:

an emergency luminaire network communication interface system including at least one transceiver configured for communication via the lighting control network over the lighting control network communication channel for lighting control and systems operations;

an emergency luminaire light source to continuously emit emergency illumination lighting during an emergency;

an emergency luminaire driver circuit coupled to the emergency luminaire light source to control light source operation of the emergency luminaire light source;

an emergency luminaire power supply driven by an emergency power line;

an emergency luminaire processor coupled to the emergency luminaire network communication interface system and the emergency luminaire driver circuit;

an emergency luminaire memory accessible to the emergency luminaire processor and including an active message gap time and an active message timeout; and emergency luminaire programming in the emergency luminaire memory, wherein execution of the emergency luminaire programming by the emergency luminaire processor configures the emergency luminaire to implement functions, including functions to:

track the active message gap time;

in response to receiving the normal power active message from another member device before the tracked active message gap time exceeds the active message timeout, reset the active message gap time;

in response to the tracked active message gap time exceeding the active message timeout, enter an emergency mode (EM) active state by controlling the emergency luminaire light source, via the emergency luminaire driver circuit, to continuously emit the emergency illumination lighting.

2. The lighting control system of claim 1, wherein:

the normal power active message is received, via the lighting control network, as a multicast normal power active packet or a broadcast normal power active packet; and the other member device is the power monitor.

3. The lighting control system of claim 1 further comprising:

a normal power line, an emergency power source, and an emergency transfer switch; wherein:

the normal power source is coupled to the normal power line and the emergency transfer switch;

the emergency power source is coupled to the emergency transfer switch;

the emergency transfer switch is coupled to the emergency power line; and the emergency transfer switch is configured to:

provide power from the normal power source to the emergency power line, determine that the normal power source is interrupted such that power is no longer available via the normal power source, and in response to determining that the normal power source is interrupted, provide power from the emergency power source to the emergency power line.

4. The lighting control system of claim 1, wherein:

the power monitor further includes one or more capacitors with a stored capacitance;

execution of the power monitor programming by the power monitor processor further configures the power monitor to implement functions, including functions to:

determine that the normal power source is interrupted such that power is no longer available via the normal power source, and in response to determining that the normal power source is interrupted, transmit a normal power override message; and execution of the emergency luminaire programming by the emergency luminaire processor further configures the emergency luminaire to implement functions, including functions to:

in response to receiving the normal power override message from another member device, enter the EM active state by controlling the emergency luminaire light source, via the emergency luminaire driver circuit, to continuously emit the emergency illumination lighting, and while the normal power source is interrupted, the power monitor is powered by the stored capacitance of the one or more capacitors.

5. The lighting control system of claim 1, wherein:

the power monitor further includes a power monitor emergency power supply driven by the emergency power line;

execution of the power monitor programming by the power monitor processor further configures the power monitor to implement functions, including functions to:

determine that the normal power source is interrupted such that power is no longer available via the normal power source, and in response to determining that the normal power source is interrupted, transmit a normal power override message; and execution of the emergency luminaire programming by the emergency luminaire processor further configures the emergency luminaire to implement functions, including functions to:

in response to receiving the normal power override message from another member device, enter the EM active state by controlling the emergency luminaire light source, via the emergency luminaire driver circuit, to continuously emit the emergency illumination lighting.

6. The lighting control system of claim 1, wherein:

the normal power source is coupled to an emergency transfer switch by a main distribution line;

the emergency power line is coupled to the emergency transfer switch; and the power monitor power supply is coupled to the main distribution line.

7. The lighting control system of claim 1, wherein:

the emergency luminaire memory further includes an intermediary message gap time and an intermediary message timeout; and execution of the emergency luminaire programming by the emergency luminaire processor further configures the emergency luminaire to implement functions, including functions to:

track the intermediary message gap time;
in response to receiving the normal power active message from another member device before the tracked intermediary message gap time exceeds the intermediary message timeout, reset the intermediary message gap time;
in response to the tracked intermediary message gap time exceeding the intermediary message timeout, transmit, via the lighting control network, a normal power query message to the lighting control group;
in response to receiving the normal power query message from another member device, determine whether the emergency luminaire has entered the EM active state;
in response to determining that the emergency luminaire has entered the EM active state, transmit, via the lighting control network, a normal power override message to the lighting control group;
in response to determining that the emergency luminaire has not entered the EM active state, transmit, via the lighting control network, the normal power active message to the lighting control group; and
in response to receiving the normal power override message from another member device, enter the EM active state by controlling the emergency luminaire light source, via the emergency luminaire driver circuit, to continuously emit the emergency illumination lighting.

8. The lighting control system of claim 1, wherein:
the active message timeout is more than twice as long as the predetermined time interval.

9. The lighting control system of claim 1, wherein:
the emergency luminaire memory further includes a missed message counter, a missed message threshold, and an interval gap time; and
execution of the emergency luminaire programming by the emergency luminaire processor further configures the emergency luminaire to implement functions, including functions to:
track the interval gap time;
in response to tracking the interval gap time, track the normal power active message received from another member device;
in response to the tracked interval gap time exceeding the predetermined time interval, determine whether the tracked normal power active message was received from another member device;
in response to determining the tracked normal power active message was received from another member device, reset the missed message counter;
in response to determining the tracked normal power active message was not received from another member device, increment the missed message counter;
in response to the missed message counter exceeding the missed message threshold, transmit, via the lighting control network, a normal power query message to the lighting control group;
in response to receiving the normal power query message from another member device, determine whether the emergency luminaire has entered the EM active state;
in response to determining that the emergency luminaire has entered the EM active state, transmit, via the lighting control network, a normal power override message to the lighting control group;
in response to determining that the emergency luminaire has not entered the EM active state, transmit, via the lighting control network, the normal power active message to the lighting control group; and
in response to receiving the normal power override message from another member device, enter the EM active state by controlling the emergency luminaire light source, via the emergency luminaire driver circuit, to continuously emit the emergency illumination lighting.

10. The lighting control system of claim 9, wherein: the missed message threshold is one, and the function to reset the missed message counter resets the missed message counter to zero.

11. The lighting control system of claim 1, further comprising:
a normal power line, an emergency power source, and an emergency transfer switch; wherein:
the normal power line is coupled between the normal power source and the emergency transfer switch;
the power monitor power supply is driven by the normal power source via the normal power line;
the emergency power source is coupled to the emergency transfer switch;
the emergency transfer switch is coupled to the emergency power line; and
the emergency transfer switch is configured to:
provide power from the normal power source to the emergency power line,
determine that the normal power source is interrupted such that power is no longer available via the normal power source, and
in response to determining that the normal power source is interrupted, provide power from the emergency power source to the emergency power line.

12. The lighting control system of claim 11, wherein:
the plurality of member devices further includes a non-emergency luminaire, the non-emergency luminaire including a non-emergency luminaire light source and a non-emergency luminaire power supply driven by the emergency power line.

13. The lighting control system of claim 12, further comprising a normal power sub-line and an emergency power sub-line; wherein:
the normal power sub-line is coupled to the emergency power line;
the emergency power sub-line is coupled to the emergency power line;
the emergency luminaire power supply is driven by the emergency power line via the emergency power sub-line;
the non-emergency luminaire power supply is driven by the emergency power line via the normal power sub-line; and
the plurality of member devices further includes a local power monitor, wherein the local power monitor includes:
a local power monitor network communication interface system including at least one transceiver configured for communication via the lighting control network over the lighting control network communication channel for lighting control and systems operations to the member devices;
a local power monitor power supply driven by the emergency power line via the normal power-sub-line;

a local power monitor processor coupled to the local power monitor network communication interface system;

a local power monitor memory accessible to the local power monitor processor; and power monitor programming in the local power monitor memory, wherein execution of the power monitor programming by the local power monitor processor configures the local power monitor to implement functions, including functions to:

transmit, via the lighting control network, the normal power active message to the lighting control group repeatedly at a predetermined time interval.

14. The lighting control system of claim 1, wherein the active message timeout is less than or equal to ten seconds, and the predetermined time period is less than or equal to four seconds.

15. The lighting control system of claim 1, wherein:

execution of the emergency luminaire programming by the emergency luminaire processor further configures the emergency luminaire to implement functions, including functions to:

in response to receiving the normal power active message from another member device, exit the EM active state by controlling the emergency luminaire light source, via the emergency luminaire driver circuit, to stop continuously emitting the emergency illumination lighting.

16. A method, comprising:

transmitting, via a lighting control network, a normal power active message to a lighting control group repeatedly at a predetermined time interval;

tracking an active message gap time;

in response to receiving the normal power active message from a member device before the tracked active message gap time exceeds an active message timeout, resetting the active message gap time;

in response to the tracked active message gap time exceeding the active message timeout, entering an emergency mode (EM) active state by controlling an emergency luminaire light source, via an emergency luminaire driver circuit, to continuously emit emergency illumination lighting.

17. The method of claim 16, further comprising:

providing power from a normal power source to an emergency power line;

determining that the normal power source is interrupted such that power is no longer available via the normal power source; and in response to determining that the normal power source is interrupted, providing power from an emergency power source to the emergency power line.

18. The method of claim 16, further comprising:

determining that a normal power source is interrupted such that power is no longer available via the normal power source;

in response to determining that the normal power source is interrupted, transmitting a normal power override message; and in response to receiving the normal power override message from a member device, entering the EM active state by controlling the emergency luminaire light source, via the emergency luminaire driver circuit, to continuously emit the emergency illumination lighting.

19. The method of claim 16, further comprising:

tracking an intermediary message gap time;

in response to receiving the normal power active message from a member device before the tracked intermediary message gap time exceeds an intermediary message timeout, resetting the intermediary message gap time;

in response to the tracked intermediary message gap time exceeding the intermediary message timeout, transmitting, via the lighting control network, a normal power query message to the lighting control group;

in response to receiving the normal power query message from the member device, determining whether the emergency luminaire has entered the EM active state;

in response to determining that the emergency luminaire has entered the EM active state, transmitting, via the lighting control network, a normal power override message to the lighting control group;

in response to determining that the emergency luminaire has not entered the EM active state, transmitting, via the lighting control network, a normal power active message to the lighting control group; and in response to receiving the normal power override message from the member device, entering the EM active state by controlling the emergency luminaire light source, via the emergency luminaire driver circuit, to continuously emit the emergency illumination lighting.

20. The method of claim 16, further comprising:

tracking an interval gap time;

in response to tracking the interval gap time, tracking the normal power active message received from a member device;

in response to the tracked interval gap time exceeding a predetermined time interval, determining whether the tracked normal power active message was received from the member device;

in response to determining the tracked normal power active message was received from the member device, resetting a missed message counter;

in response to determining the tracked normal power active message was not received from the member device, incrementing the missed message counter;

in response to the missed message counter exceeding a missed message threshold, transmitting, via the lighting control network, a normal power query message to the lighting control group;

in response to receiving the normal power query message from the member device, determining whether the emergency luminaire has entered the EM active state;

in response to determining that the emergency luminaire has entered the EM active state, transmitting, via the lighting control network, a normal power override message to the lighting control group;

in response to determining that the emergency luminaire has not entered the EM active state, transmitting, via the lighting control network, the normal power active message to the lighting control group; and in response to receiving the normal power override message from another member device, entering the EM active state by controlling the emergency luminaire light source, via the emergency luminaire driver circuit, to continuously emit the emergency illumination lighting.

* * * * *